US006763123B2

(12) United States Patent
Reed et al.

(10) Patent No.: US 6,763,123 B2
(45) Date of Patent: Jul. 13, 2004

(54) DETECTION OF OUT-OF-PHASE LOW VISIBILITY WATERMARKS

(75) Inventors: Alastair M. Reed, Lake Oswego, OR (US); Jeremy Cattone, Tigard, OR (US)

(73) Assignee: Digimarc Corporation, Tualatin, OR (US)

( * ) Notice: Subject to any disclaimer, the term of this patent is extended or adjusted under 35 U.S.C. 154(b) by 254 days.

(21) Appl. No.: 09/933,863

(22) Filed: Aug. 20, 2001

(65) Prior Publication Data

US 2002/0067844 A1 Jun. 6, 2002

Related U.S. Application Data

(63) Continuation-in-part of application No. 09/898,901, filed on Jul. 2, 2001, which is a continuation-in-part of application No. 09/553,084, filed on Apr. 19, 2000, now Pat. No. 6,590,996, which is a continuation-in-part of application No. 09/503,881, filed on Feb. 14, 2000, now Pat. No. 6,614,914, which is a continuation-in-part of application No. 09/186,962, filed on Nov. 5, 1998, which is a continuation of application No. 08/649,419, filed on May 16, 1996, now Pat. No. 5,862,260, which is a continuation-in-part of application No. PCT/US96/06618, filed on May 7, 1996, and a continuation-in-part of application No. 08/637,531, filed on Apr. 25, 1996, now Pat. No. 5,822,436, and a continuation-in-part of application No. 08/534,005, filed on Sep. 25, 1995, now Pat. No. 5,832,119, and a continuation-in-part of application No. 08/436,102, filed on May 8, 1995, now Pat. No. 5,748,783.

(51) Int. Cl.[7] .................................................. G06K 9/00
(52) U.S. Cl. ....................................... 382/100; 382/162
(58) Field of Search ................................. 382/100, 312, 382/232, 250; 235/375; 375/150; 358/3.28; 380/54; 713/176

(56) References Cited

U.S. PATENT DOCUMENTS 4,504,084 A    3/1985    Jauch (List continued on next page.)

FOREIGN PATENT DOCUMENTS

| DE | 2943436 | 5/1981 |
|---|---|---|
| EP | 590884 | 4/1994 |

(List continued on next page.)

OTHER PUBLICATIONS

U.S. patent application Ser. No. 60/082,228, Rhoads, filed Apr. 16, 1998.
U.S. patent application Ser. No. 09/433,104, Rhoads et al., filed Nov. 3, 1999.
U.S. patent application Ser. No. 09/465,418, Rhoads et al., filed Dec. 16, 1999.
U.S. patent application Ser. No. 09/503,881, Rhoads et al., filed Feb. 14, 2000.
U.S. patent application Ser. No. 09/553,084, Reed et al., filed Apr. 19, 2000.

(List continued on next page.)

*Primary Examiner*—Jayanti K. Patel
(74) *Attorney, Agent, or Firm*—Digimarc Corporation

(57) ABSTRACT

The present invention relates to detecting digital watermarks. In a preferred embodiment, media is embedded with a digital watermark component. The media includes a cyan color plane, a magenta color plane, a yellow color plane, and a black color plane. The digital watermark component is embedded in the cyan, magenta, and yellow color planes. The digital watermark component is inverted and is embedded in the black color plane. The embedded media is illuminated with infrared light, which emphasizes the black color plane. An input device captures a digital image of the illuminated media. The digital watermark component is detected from the emphasized black plane.

36 Claims, 16 Drawing Sheets

U.S. PATENT DOCUMENTS

| | | |
|---|---|---|
| 4,725,462 A | 2/1988 | Kimura |
| 4,739,377 A | 4/1988 | Allen |
| 5,051,835 A | 9/1991 | Bruehl et al. |
| 5,093,147 A | 3/1992 | Andrus et al. |
| 5,291,243 A | 3/1994 | Heckman et al. |
| 5,337,361 A | 8/1994 | Wang |
| 5,363,212 A | 11/1994 | Taniuchi et al. |
| 5,385,371 A | 1/1995 | Izawa |
| 5,481,377 A | 1/1996 | Udagawa et al. |
| 5,502,576 A * | 3/1996 | Ramsay et al. ............. 358/444 |
| 5,530,751 A | 6/1996 | Morris |
| 5,530,759 A | 6/1996 | Braudaway et al. |
| 5,557,412 A | 9/1996 | Saito et al. |
| 5,568,555 A | 10/1996 | Shamir |
| 5,572,433 A * | 11/1996 | Falconer et al. ............ 700/127 |
| 5,617,119 A | 4/1997 | Briggs et al. |
| 5,621,810 A | 4/1997 | Suzuki et al. |
| 5,636,874 A | 6/1997 | Singer |
| 5,646,997 A | 7/1997 | Barton |
| 5,652,626 A | 7/1997 | Kawakami et al. |
| 5,659,628 A | 8/1997 | Tachikawa et al. |
| 5,659,726 A | 8/1997 | Sandford et al. |
| 5,661,574 A | 8/1997 | Kawana |
| 5,687,236 A | 11/1997 | Moskowitz et al. |
| 5,689,623 A | 11/1997 | Pinard |
| 5,696,594 A | 12/1997 | Saito et al. |
| 5,721,788 A | 2/1998 | Powell et al. |
| 5,729,741 A * | 3/1998 | Liaguno et al. .......... 707/104.1 |
| 5,748,763 A | 5/1998 | Rhoads |
| 5,760,386 A | 6/1998 | Ward |
| 5,787,186 A | 7/1998 | Schroeder |
| 5,788,285 A | 8/1998 | Wicker |
| 5,790,693 A | 8/1998 | Graves et al. |
| 5,790,703 A | 8/1998 | Wang |
| 5,809,139 A | 9/1998 | Girod et al. |
| 5,822,436 A | 10/1998 | Rhoads |
| 5,825,892 A | 10/1998 | Braudaway et al. |
| 5,832,186 A | 11/1998 | Kawana |
| 5,838,814 A | 11/1998 | Moore |
| 5,862,218 A | 1/1999 | Steinberg |
| 5,862,260 A | 1/1999 | Rhoads |
| 5,875,249 A | 2/1999 | Mintzer et al. |
| 5,893,101 A | 4/1999 | Balogh et al. |
| 5,905,800 A | 5/1999 | Moskowitz et al. |
| 5,905,819 A | 5/1999 | Daly |
| 5,915,027 A | 6/1999 | Cox et al. |
| 5,919,730 A | 7/1999 | Gasper et al. |
| 5,930,369 A | 7/1999 | Cox et al. |
| 5,933,798 A | 8/1999 | Linnartz |
| 5,946,414 A | 8/1999 | Cass et al. |
| 5,951,055 A | 9/1999 | Mowry, Jr. |
| 5,960,081 A | 9/1999 | Vynne et al. |
| 5,960,103 A | 9/1999 | Graves et al. |
| 5,974,548 A | 10/1999 | Adams |
| 5,978,013 A | 11/1999 | Jones et al. |
| 6,045,656 A | 4/2000 | Foster et al. |
| 6,046,808 A | 4/2000 | Fateley |
| 6,054,021 A | 4/2000 | Kurrle et al. |
| 6,081,827 A | 6/2000 | Reber |
| 6,094,483 A | 7/2000 | Fridrich et al. |
| 6,104,812 A | 8/2000 | Koltai et al. |
| 6,122,403 A | 9/2000 | Rhoads |
| 6,128,411 A | 10/2000 | Knox |
| 6,136,752 A | 10/2000 | Paz-Pujalt et al. |
| 6,185,312 B1 | 2/2001 | Nakamura et al. |
| 6,185,683 B1 | 2/2001 | Ginter et al. |
| 6,192,138 B1 | 2/2001 | Yamadaji |
| 6,201,879 B1 | 3/2001 | Bender et al. |
| 6,233,347 B1 | 5/2001 | Chen et al. |
| 6,233,684 B1 | 5/2001 | Stefik et al. |
| 6,234,537 B1 | 5/2001 | Gutmann et al. |
| 6,246,777 B1 | 6/2001 | Gutmann et al. |
| 6,272,176 B1 | 8/2001 | Srinivasan |
| 6,272,248 B1 | 8/2001 | Saitoh et al. |
| 6,272,634 B1 | 8/2001 | Tewfik et al. |
| 6,278,792 B1 | 8/2001 | Cox et al. |
| 6,281,165 B1 | 8/2001 | Cranford |
| 6,285,776 B1 | 9/2001 | Rhoads |
| 6,304,345 B1 | 10/2001 | Patton et al. |
| 6,314,192 B1 | 11/2001 | Chen et al. |
| 6,320,675 B1 | 11/2001 | Sakaki et al. |
| 6,332,031 B1 | 12/2001 | Rhoads et al. |
| 6,332,194 B1 | 12/2001 | Bloom et al. |
| 6,334,187 B1 | 12/2001 | Kadono |
| 6,356,363 B1 | 3/2002 | Cooper et al. |
| 6,373,965 B1 | 4/2002 | Liang |
| 6,390,362 B1 | 5/2002 | Martin |
| 6,394,358 B1 | 5/2002 | Thaxton et al. |
| 6,404,926 B1 | 6/2002 | Miyahara et al. |
| 6,418,232 B1 | 7/2002 | Nakano et al. |
| 6,427,020 B1 | 7/2002 | Rhoads |
| 6,438,251 B1 | 8/2002 | Yamaguchi |
| 6,456,726 B1 | 9/2002 | Yu |
| 6,481,753 B2 | 11/2002 | Van Boom et al. |
| 2001/0014169 A1 | 8/2001 | Liang |
| 2001/0021144 A1 | 9/2001 | Oshima et al. |
| 2001/0024510 A1 | 9/2001 | Iwamura |
| 2001/0026377 A1 | 10/2001 | Ikegami |
| 2001/0028727 A1 | 10/2001 | Naito et al. |
| 2001/0030759 A1 | 10/2001 | Hayashi et al. |
| 2001/0030761 A1 | 10/2001 | Ideyahma |
| 2001/0033674 A1 | 10/2001 | Chen et al. |
| 2001/0037313 A1 | 11/2001 | Lofgren et al. |
| 2001/0037455 A1 | 11/2001 | Lawandy et al. |
| 2001/0040980 A1 | 11/2001 | Yamaguchi |
| 2001/0052076 A1 | 12/2001 | Kadono |
| 2001/0053235 A1 | 12/2001 | Sato |
| 2001/0054644 A1 | 12/2001 | Liang |
| 2002/0015509 A1 | 2/2002 | Nakamura et al. |
| 2002/0018879 A1 | 2/2002 | Barnhart et al. |
| 2002/0021824 A1 | 2/2002 | Reed et al. |
| 2002/0023218 A1 | 2/2002 | Lawandy et al. |
| 2002/0027612 A1 | 3/2002 | Brill et al. |
| 2002/0027674 A1 | 3/2002 | Tokunaga et al. |
| 2002/0031241 A1 | 3/2002 | Kawaguchi et al. |
| 2002/0033844 A1 | 3/2002 | Levy et al. |
| 2002/0040433 A1 | 4/2002 | Kondo |
| 2002/0057431 A1 | 5/2002 | Fateley et al. |
| 2002/0061121 A1 | 5/2002 | Rhoads et al. |
| 2002/0061122 A1 | 5/2002 | Fujihara |
| 2002/0062442 A1 | 5/2002 | Kurahashi |
| 2002/0064298 A1 | 5/2002 | Rhoads et al. |
| 2002/0067844 A1 | 6/2002 | Reed et al. |
| 2002/0068987 A1 | 6/2002 | Hars |
| 2002/0073317 A1 | 6/2002 | Hars |
| 2002/0080396 A1 | 6/2002 | Silverbrook et al. |
| 2002/0083123 A1 | 6/2002 | Freedman et al. |
| 2002/0097873 A1 | 7/2002 | Petrovic |
| 2002/0099943 A1 | 7/2002 | Rodriguez et al. |
| 2002/0118394 A1 | 8/2002 | McKinley et al. |
| 2002/0122568 A1 | 9/2002 | Zhao |
| 2002/0141310 A1 | 10/2002 | Stephany |
| 2002/0150246 A1 | 10/2002 | Ogino |
| 2002/0163633 A1 | 11/2002 | Cohen |
| 2002/0164051 A1 * | 11/2002 | Reed et al. |
| 2002/0176600 A1 | 11/2002 | Rhoads et al. |
| 2003/0005304 A1 | 1/2003 | Lawandy et al. |
| 2003/0012562 A1 | 1/2003 | Lawandy et al. |
| 2003/0032033 A1 | 2/2003 | Anglin et al. |
| 2003/0056104 A1 | 3/2003 | Carr et al. |

FOREIGN PATENT DOCUMENTS

| | | | |
|---|---|---|---|
| EP | 642060 | 3/1995 | |
| EP | 705022 | 4/1996 | |
| EP | 991047 | 4/2000 | |
| EP | 1077570 | 2/2001 | |
| EP | 1137244 | 9/2001 | |
| EP | 1152592 | 11/2001 | |
| EP | 1173001 | 1/2002 | |
| EP | 1209897 | 5/2002 | |
| GB | 1534403 | 12/1978 | |
| GB | 2360659 | 9/2001 | |
| JP | 07093567 | 4/1995 | |
| JP | 07108786 | 4/1995 | |
| WO | WO95/13597 | 5/1995 | |
| WO | WO96/03286 | 2/1996 | |
| WO | WO 96/36163 | * | 11/1996 |
| WO | WO 99/10837 | * | 3/1999 |
| WO | WO 00/16546 | * | 3/2000 |
| WO | WO01/05075 | 1/2001 | |
| WO | WO01/08405 | 2/2001 | |
| WO | WO01/39121 | 5/2001 | |
| WO | WO01/72030 | 9/2001 | |
| WO | WO01/73997 | 10/2001 | |
| WO | WO01/97128 | 12/2001 | |
| WO | WO01/97175 | 12/2001 | |
| WO | WO02/19269 | 3/2002 | |
| WO | WO02/21846 | 3/2002 | |
| WO | WO02/23481 | 3/2002 | |
| WO | WO01/88883 | 11/2002 | |

OTHER PUBLICATIONS

U.S. patent application Ser. No. 09/562,516, Rodriguez et al., filed May 1, 2000.

U.S. patent application Ser. No. 09/619,264, Kumar, filed Jul. 19, 2000.

U.S. patent application Ser. No. 09/694,465, Rodriguez et al., filed Oct. 23, 2000.

U.S. patent application Ser. No. 60/323,148, Davis et al., filed Sep. 17, 2001.

Alattar, "'Smart Images' Using Digimarc's Watermarking Technology," IS&T/SPIE's 12*th* Int. Symposium on Electronic Imaging, San Jose, CA, Jan. 25, 2000, vol. 3971, No. 25, 10 pages.

Battialo et al., "Robust Watermarking for Images Based on Color Manipulation," IH/99 LNCS 1768, pp. 302–317, 2000.

Bender et al., "Applications for Data Hiding," IBM Systems Journal, vol. 39, Nos 3&4, 2000, pp. 547–568.

Bors et al., "Image Watermarking Using DCT Domain Contraints," Proc. Int. Conf. on Image Processing, vol. 3, pp. 231–234.

Brownell, "Counterfeiters Dye Over Security Measures," SPIE's OE Magazine, Sep. 2001, pp. 8–9.

Fleet et al., "Embedding Invisible Information in Color Images," Proc. Int. Conf. on Image Processing, vol. 1, pp. 532–535, Oct., 1997.

Frequently Asked Questions About Digimarc Signature Technology, Aug. 1, 1995, http://www.digimarc.com, 9 pages.

"Holographic signatures for digital images," *The Seybold Report on Desktop Publishing*, Aug. 1995, one page.

Hunt, "The Reproduction of Colour in Photography, Printing & Television," 1987, pp. 588–589 and Plate 35 (in color).

Kohda et al., "Digital Watermarking Through CDMA Channels Using Spread Spectrum Techniques," 2000 IEEE, pp. 671–674.

Komatsu et al., "A Proposal on Digital Watermark in Document Image Communication and Its Application to Realizing a Signature," Electronics and Communications in Japan, Part 1, vol. 73, No. 5, 1990, pp. 22–33.

Komatsu et al., "Authentication System Using Concealed Image in Telematics," Memoirs of the School of Science & Engineering, Waseda Univ., No. 52, 1988, pp. 45–60.

Kutter et al., "Digital Signature of Color Images Using Amplitude Modulation," SPIE vol. 3022, 1997, pp. 518–526.

ORuanaidh et al, "Watermarking Digital Images for Copyright Protection," http://www.kalman.mee.tcd.ie/people/jjr/eva_pap.html, Feb. 2, 1996, 8 pages.

Piva et al., "Exploiting the Cross–Correlation of RGB––Channels for Robust Watermarking of Color Images," 1999 IEEE, pp. 306–310.

Vidal et al., "Non–Noticeable Information Embedding in Color Images: Marking and Detection," IEEE (1999), pp. 293–297.

Voyatzis et al., "Embedding Robust Watermarks by Chaotic Mixing," Digital Signal Processing Proceedings, IEEE Jul. 1977, pp. 213–216, vol. 1.

Wang et al., "Embedding Digital Watermarks in Halftone Screens," Security and Watermarking of Multimedia Contents II, Proc. of SPIE vol. 3971 (2000), pp. 218–227.

* cited by examiner

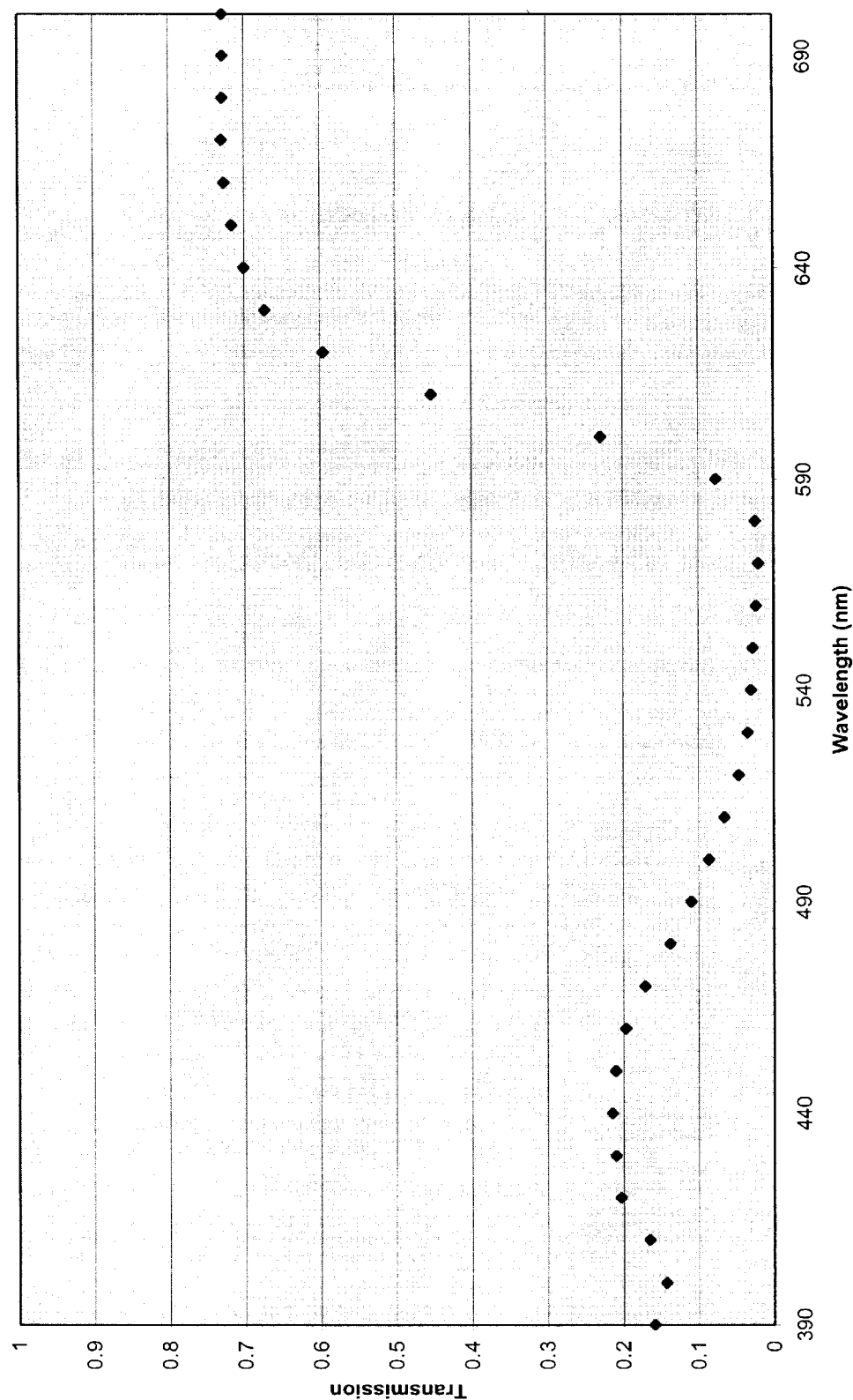
FIG. 16a -- Magenta

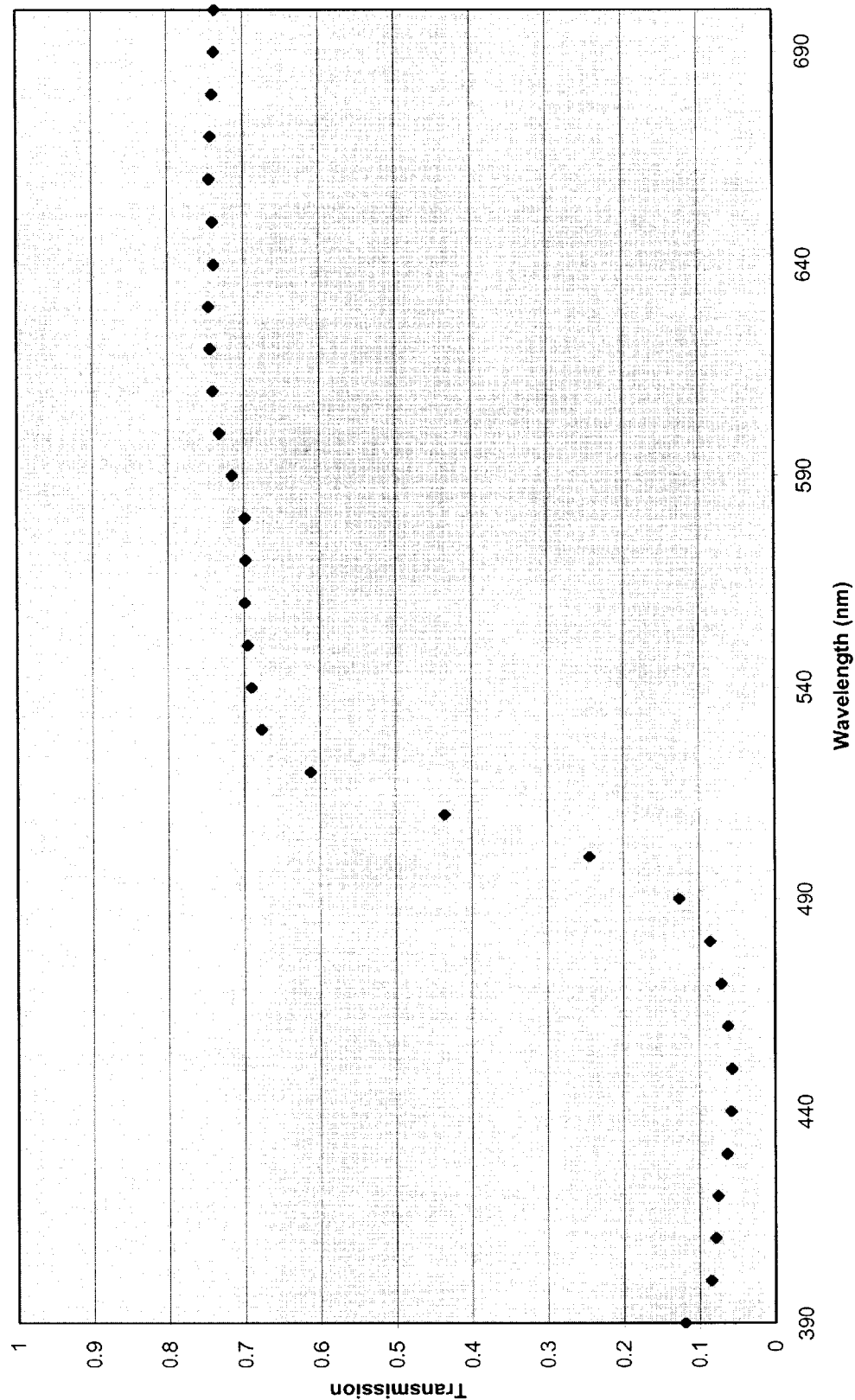
FIG. 16b -- Yellow

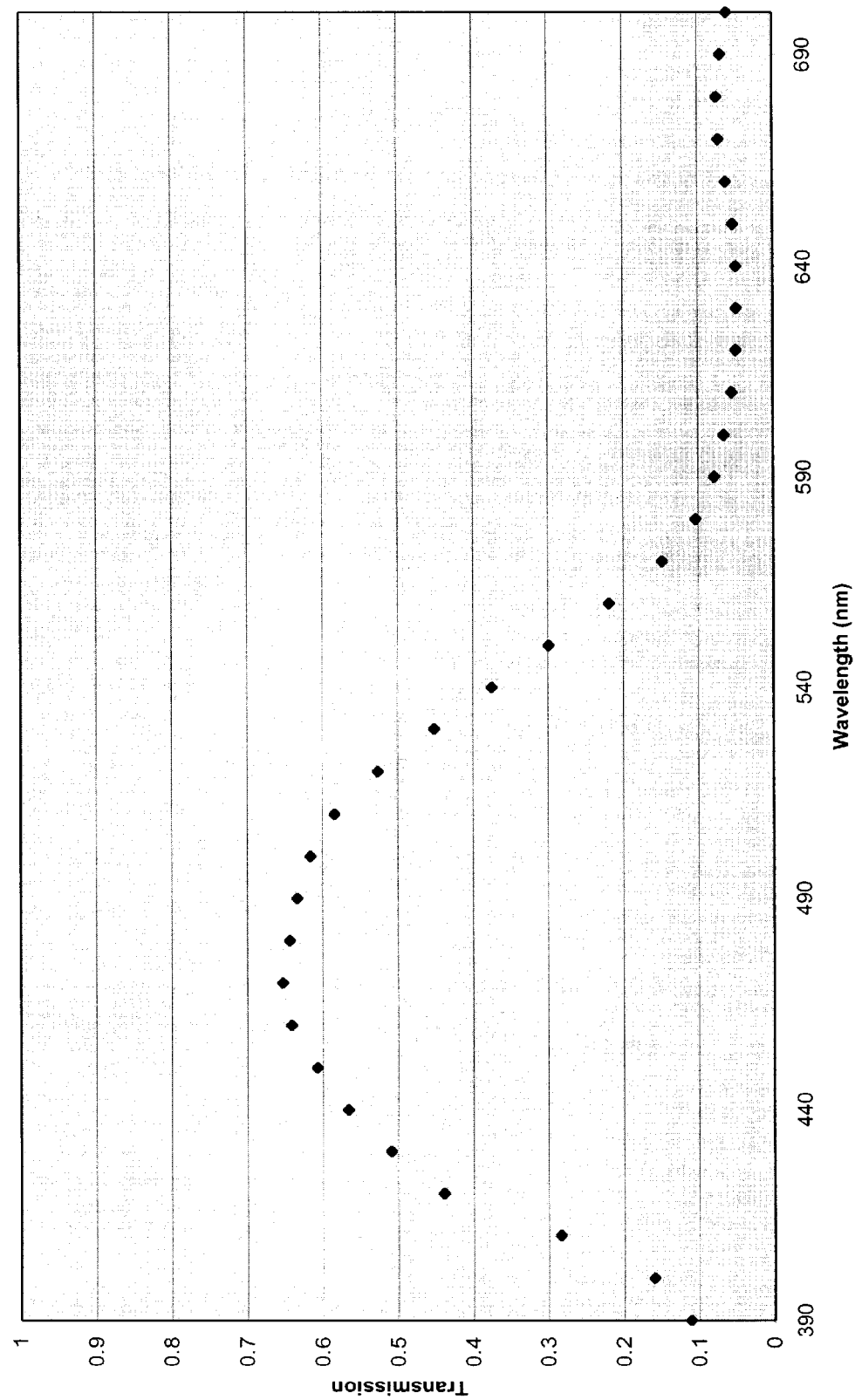
FIG. 16C -- Cyan

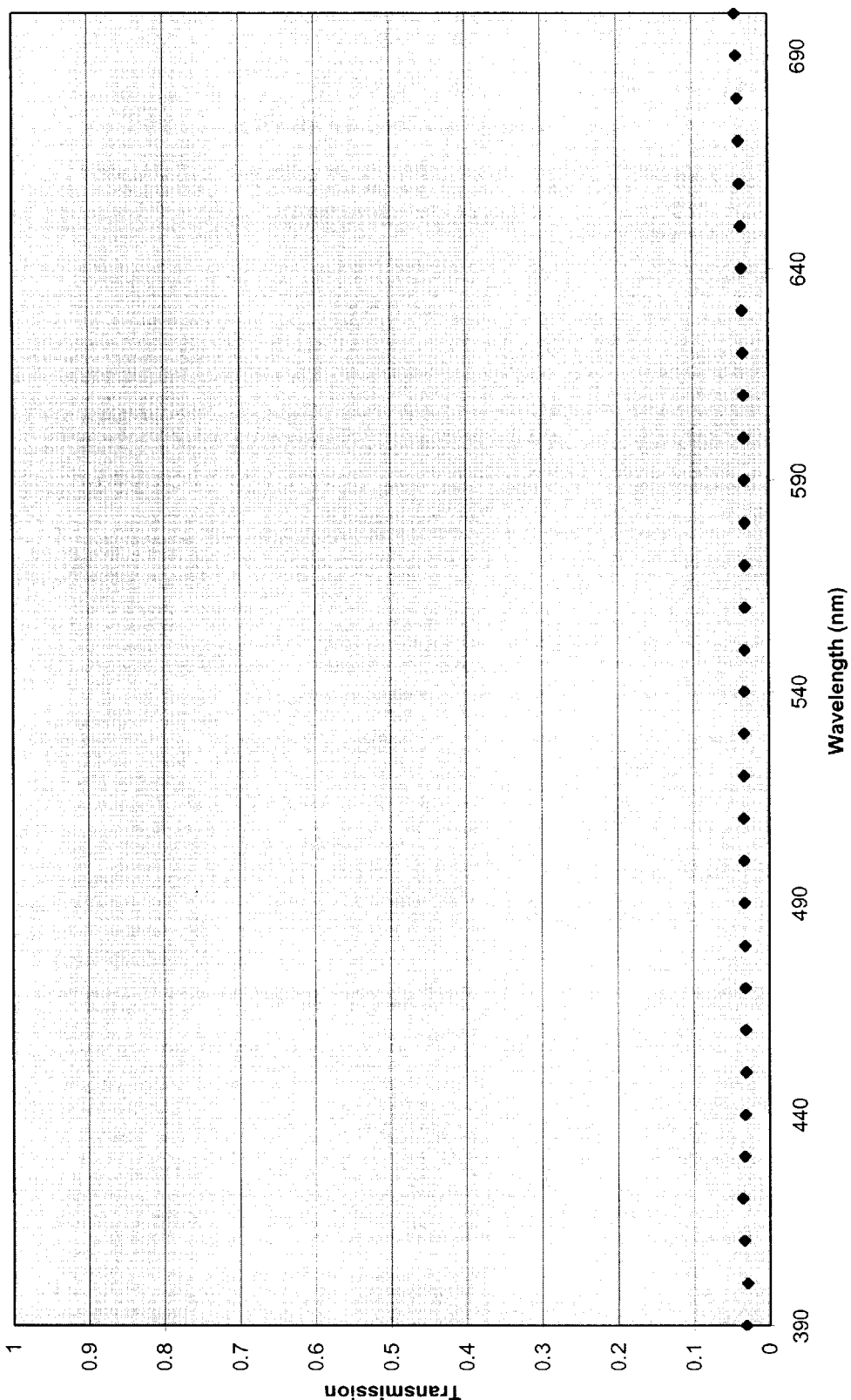
FIG. 16d -- Black

DETECTION OF OUT-OF-PHASE LOW VISIBILITY WATERMARKS

RELATED APPLICATION DATA

This application is a continuation in part of U.S. patent application Ser. No. 09/898,901, filed Jul. 2, 2001, which is a continuation in part of U.S. patent application Ser. No. 09/553,084, filed Apr. 19, 2000 now U.S. Pat. No. 6,590, 996. (Although not claimed as priority in the present specification, application Ser. No. 09/553,084 is a continuation-in-part of U.S. patent application Ser. No. 09/503,881, filed Feb. 14, 2000, now U.S. Pat. No. 6,614, 914 which is a continuation in part of application Ser. No. 09/186,962, filed Nov. 5, 1998, which is a continuation of application Ser. No. 08/649,419, filed May 16, 1996, now U.S. Pat. No. 5,862,260. Application Ser. No. 08/649,419 is a continuation in part of PCT/US96/06618, filed May 7, 1996, U.S. application Ser. No. 08/637,531, filed Apr. 25, 1996 (now U.S. Pat. No. 5,822,436), U.S. application Ser. No. 08/534,005, filed Sep. 25, 1995 (now U.S. Pat. No. 5,832,119), and U.S. application Ser. No. 08/436,102, filed May 8, 1995 (now U.S. Pat. No. 5,748,783).)

FIELD OF THE INVENTION

The present invention relates to digital watermarking systems and methods, and is particularly illustrated with reference to fragile and low-visibility watermarks.

BACKGROUND AND SUMMARY OF THE INVENTION

In color image processing applications, it is useful to understand how humans perceive colors. By understanding the human visual system and its sensitivity to certain colors, one can more effectively create and manipulate images to create a desired visual effect. This assertion is particularly true in image processing applications that intentionally alter an image to perform a desired function, like hiding information in an image or compressing an image. In digital watermarking, for example, one objective is to encode auxiliary information into a signal, such as an image or video sequence, so that the auxiliary information is substantially imperceptible to humans in an output form of the signal.

Digital watermarking technology, a form of steganography, encompasses a great variety of techniques by which plural bits of digital data are hidden in some other object, preferably without leaving human-apparent evidence of alteration.

Digital watermarking may be used to modify media content to embed a machine-readable code into the media content. The media may be modified such that the embedded code is imperceptible or nearly imperceptible to the user, yet may be detected through an automated detection process.

Most commonly, digital watermarking is applied to media signals such as images, audio, and video signals. However, it may also be applied to other types of media, including documents (e.g., through line, word or character shifting, through texturing, graphics, or backgrounds, etc.), software, multi-dimensional graphics models, and surface textures of objects.

There are many processes by which media can be processed to encode a digital watermark. Some techniques employ very subtle printing, e.g., of fine lines or dots, which has the effect slightly tinting the media (e.g., a white media can be given a lightish-green cast). To the human observer the tinting appears uniform. Computer analyses of scan data from the media, however, reveals slight localized changes, permitting a multi-bit watermark payload to be discerned. Such printing can be by ink jet, dry offset, wet offset, xerography, etc. Other techniques vary the luminance or gain values in a signal to embed a message signal. The literature is full of other well-known digital watermarking techniques.

The encoding of a document can encompass artwork or printing on the document, the document's background, a laminate layer applied to the document, surface texture, etc. If a photograph or image is present, it too can be encoded.

Printable media—especially for security documents (e.g., banknotes) and identity documents (e.g., passports)—is increasingly fashioned from synthetic materials. Polymeric films, such as are available from UCB Films, PLC of Belgium, are one example. Such films may be clear and require opacification prior to use as substrates for security documents. The opacification can be affected by applying plural layers of ink or other material, e.g., by gravure or offet printing processes. (Suitable inks are available, e.g., from Sicpa Securink Corp. of Springfield, Va.) In addition to obscuring the transparency of the film, the inks applied through the printing process form a layer that is well suited to fine-line printing by traditional intaglio methods. Such an arrangement is more particularly detailed in laid-open PCT publication WO98/33758.

Digital watermarking systems typically have two primary components: an embedding component that embeds the watermark in the media content, and a reading component that detects and reads the embedded watermark. The embedding component embeds a watermark pattern by altering data samples of the media content. The reading component analyzes content to detect whether a watermark pattern is present. In applications where the watermark encodes information, the reading component extracts this information from the detected watermark. Previously mentioned U.S. patent application Ser. No. 09/503,881, filed Feb. 14, 2000, discloses various encoding and decoding techniques. U.S. Pat. Nos. 5,862,260 and 6,122,403 disclose still others. Of course, artisans know many other watermarking techniques that may be suitably interchanged with some aspects of the present invention.

One form of digital watermarks is a so-called "fragile" watermark. A fragile watermark is designed to be lost, or to degrade predictably, when the data set into which it is embedded is processed in some manner, such as signal processing, compression scanning/printing, etc. A watermark may be made fragile in numerous ways. One form of fragility relies on low watermark amplitude. That is, the strength of the watermark is only marginally above the minimum needed for detection. If any significant fraction of the signal is lost, as typically occurs in photocopying operations, the watermark becomes unreadable. Another form of fragility relies on the watermark's frequency spectrum. High frequencies are typically attenuated in the various sampling operations associated with digital scanning and printing. Even a high amplitude watermark signal can be significantly impaired, and rendered unreadable, by such photocopying operations. (Fragile watermark technology and various applications of such are even further disclosed, e.g., in assignee's U.S. patent application Ser. Nos. 09/234, 780, 09/433,104, 09/498,223, 60/198,138, 09/562,516, 09/567,405, 09/625,577, 09/645,779, and 60/232,163.).

The present invention discloses a new fragile watermarking technique that is particularly well suited for color imaging applications. A watermark signal in one color plane (or channel) is applied to be out-of-phase with corresponding watermark signals in other color planes (or channels). An effect of the inventive out-of-phase watermarking technique is to greatly reduce watermark visibility by canceling perceived luminance change in local areas throughout the image. The disclosed watermark is also fragile, since signal-processing operations that combine the out-of-phase color channel with the other channels cancels the watermark signal. The wm can be detected using infrared detection methods described herein.

The foregoing and other features and advantages of the present invention will be more readily apparent from the following detailed description, which proceeds with reference to the accompanying drawings.

BRIEF DESCRIPTION OF THE DRAWINGS

FIGS. 16a–16d are graphs illustrating transmission characteristics for magenta, yellow, cyan and black, respectively.

DETAILED DESCRIPTION

Introduction

Figure 1:
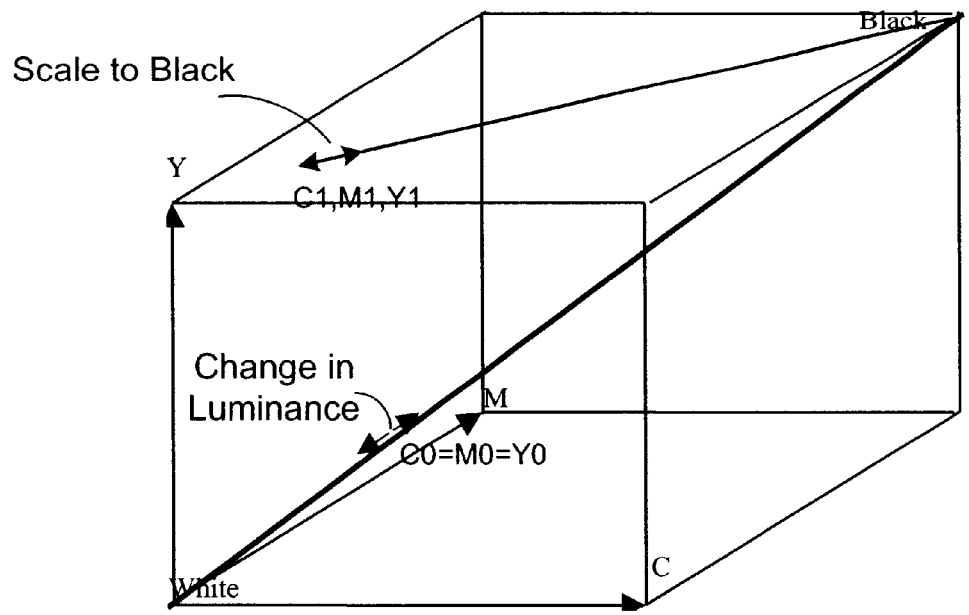
FIG. 1 is a diagram of a color space depicting how to scale a color vector to black to effect a change in luminance.

A watermark can be viewed as an information signal that is embedded in a host signal, such as an image, audio, video or some other media content. Watermarking systems typically include the following components: 1) an embedder that inserts a watermark signal in the host signal to form a combined signal; 2) a detector that determines the presence and orientation of a watermark in a potentially corrupted version of the combined signal; and 3) a reader that extracts a watermark message from the combined signal. In some implementations, the detector and reader are combined.

To encode a message, the watermark encoder analyzes and selectively adjusts the host signal to give it attributes that correspond to a desired message symbol or symbols to be encoded. There are many signal attributes that may encode a message symbol, such as a positive or negative polarity of signal samples or a set of samples, a given parity (odd or even), a given difference value or polarity of the difference between signal samples (e.g., a difference between selected spatial intensity values or transform coefficients), a given distance value between watermarks, a given phase or phase offset between different watermark components, a modulation of the phase of the host signal, a modulation of frequency coefficients of the host signal, a given frequency pattern, a given quantizer (e.g., in Quantization Index Modulation), etc.

The structure and complexity of a watermark signal can vary significantly, depending on the application. For example, the watermark may be comprised of one or more signal components, each defined in the same or different domains. Each component may perform one or more functions. Two primary functions include acting as an identifier to facilitate detection and acting as an information carrier to convey a message. In addition, components may be located in different spatial or temporal portions of the host signal, and may carry the same or different messages.

The host signal can vary as well. The host is typically some form of multidimensional media signal, such as an image, audio sequence or video sequence. In the digital domain, each of these media types is represented as a multi-dimensional array of discrete samples. For example, a color image has spatial dimensions (e.g., its horizontal and vertical components), and color space dimensions (e.g., CMYK, YUV, Lab or RGB). Some signals, like video, have spatial and temporal dimensions. Depending on the needs of a particular application, the embedder may insert a watermark signal that exists in one or more of these dimensions.

In the design of the watermark and its components, developers are faced with several design issues such as: the extent to which the mark is impervious to jamming and manipulation (either intentional or unintentional); the extent of imperceptibility; the quantity of information content; the extent to which the mark facilitates detection and recovery, and the extent to which the information content can be recovered accurately.

For certain applications, such as copy protection or authentication, the watermark should be difficult to tamper with or remove by those seeking to circumvent it. To be robust, the watermark should withstand routine manipulation, such as data compression, copying, linear transformation, flipping, inversion, etc., and intentional manipulation intended to remove the mark or make it undetectable. Some applications require the watermark signal to remain robust through digital to analog conversion (e.g., printing an image or playing music), and analog to digital conversion (e.g., scanning the image or digitally sampling the music). In some cases, it is beneficial for the watermarking technique to withstand repeated watermarking.

For other applications, such as forensic tracking, counterfeit detection, etc., the watermark should degrade predictably under routine manipulation. Such watermarks are referred to generally as "fragile" watermarks, as discussed above.

A variety of signal processing techniques may be applied to address some or all of these design considerations. One such technique is referred to as spreading. Sometimes categorized as a spread spectrum technique, spreading is a way to distribute a message into a number of components (chips), which together make up the entire message. Spreading makes the mark more impervious to jamming and manipulation, and makes it less perceptible.

Another category of signal processing technique is error correction and detection coding. Error correction coding is useful to reconstruct the message accurately from the watermark signal. Error detection coding enables the decoder to determine when the extracted message has an error.

Another signal processing technique that is useful in watermark coding is called scattering. Scattering is a method of distributing the message or its components among an array of locations in a particular transform domain, such as a spatial domain or a spatial frequency domain. Like spreading, scattering makes the watermark less perceptible and more impervious to manipulation.

Yet another signal processing technique is gain control. Gain control is used to adjust the intensity of the watermark signal. The intensity of the signal impacts a number of aspects of watermark coding, including its perceptibility to the ordinary observer, and the ability to detect the mark and accurately recover the message from it.

Gain control can impact the various functions and components of the watermark differently. Thus, in some cases, it is useful to control the gain while taking into account its impact on the message and orientation functions of the watermark or its components. For example, in a watermark system described below, the embedder calculates a different gain for orientation and message components of an image watermark.

Another useful tool in watermark embedding and reading is perceptual analysis. Perceptual analysis refers generally to techniques for evaluating signal properties based on the extent to which those properties are (or are likely to be) perceptible to humans (e.g., listeners or viewers of the media content). A watermark embedder can take advantage of a Human Visual System (HVS) model to determine where to place an image watermark and how to control the intensity of the watermark so that chances of accurately recovering the watermark are enhanced, resistance to tampering is increased, and perceptibility of the watermark is reduced. Similarly, audio watermark embedder can take advantage of a Human Auditory System model to determine how to encode an audio watermark in an audio signal to reduce audibility. Such perceptual analysis can play an integral role in gain control because it helps indicate how the gain can be adjusted relative to the impact on the perceptibility of the mark. Perceptual analysis can also play an integral role in locating the watermark in a host signal. For example, one might design the embedder to hide a watermark in portions of a host signal that are more likely to mask the mark from human perception.

Various forms of statistical analyses may be performed on a signal to identify places to locate the watermark, and to identify places where to extract the watermark. For example, a statistical analysis can identify portions of a host image that have noise-like properties that are likely to make recovery of the watermark signal difficult. Similarly, statistical analyses may be used to characterize the host signal to determine where to locate the watermark.

Each of the techniques may be used alone, in various combinations, and in combination with other signal processing techniques.

In addition to selecting the appropriate signal processing techniques, the developer is faced with other design considerations. One consideration is the nature and format of the media content. In the case of digital images, for example, the image data is typically represented as an array of image samples. Color images are represented as an array of color vectors in a color space, such as RGB or YUV. The watermark may be embedded in one or more of the color components of an image. In some implementations, the embedder may transform the input image into a target color space, and then proceed with the embedding process in that color space.

Color Image Processing

In image processing applications, it is sometimes useful to be able to change the colors of an image while reducing the visibility of these changes. Image watermarking is one application where it is desirable to alter image samples to encode information in a manner that is readily recoverable by an automated process, yet substantially imperceptible to human visual perception. Often, the aim of watermark encoding is to maximize a watermark signal without significantly affecting image quality. Since the eye is more sensitive to changes in memory colors such as flesh tones or blue sky, it is beneficial to have a method of selectively controlling strength of a watermark in certain color regions. Previously mentioned U.S. patent application Ser. No. 09/553,084 discloses various methods for such.

In one embodiment, a watermark encodes auxiliary information in an image by making changes to image samples. A color-masking framework maps a change in an image sample attribute to an equivalent yet less perceptible change in the color values of that image sample. This mapping can be used to obtain equal perceptual watermark changes to image samples in other areas of color space and to apply the change in the least visible color channels.

While the implementation details of watermark encoding schemes vary significantly, a class of watermarking schemes can be modeled as an array of changes to luminance values of a host image. The host image comprises an array of color vectors (e.g., an array of color such as RGB, CMY, CMYK, etc). The image sample maybe represented as a vector between black and the pixel color value. To encode a watermark, the luminance of the image sample may be increased or decreased as shown in FIG. 1. FIG. 1 shows a 3-dimensional color space with Cyan (C), Magenta (M) and Yellow (Y) axes. The bold axis between black and white represents luminance. To make an equivalent luminance change in an image sample of a given color vector (C1, M1, Y1), one may make a corresponding scale to black as shown.

Figure 2:
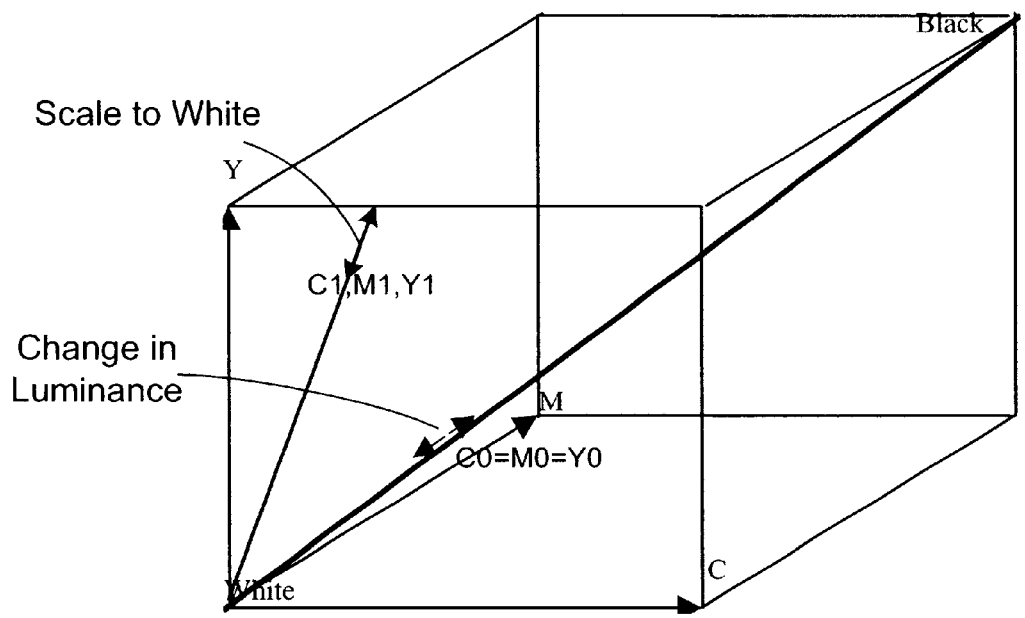
FIG. 2 is a diagram of a color space depicting how to scale a color vector to white to effect a change in luminance.

An alternative method of obtaining the same luminance change is to scale the image sample like a vector between white and the sample's color value as shown in FIG. 2. To make an equivalent luminance change, one may make a corresponding scale to white as shown.

By using the scale to white method for colors with high yellow content such as yellow, red and green, and scale to black for blue, cyan and magenta a lower visibility watermark can be encoded with the same detectability.

Once the color vector entries are established, each of the entries is associated with a set of scale factors. The set includes a scale factor for each color component. The specific color components in the implementation depend on the color format of the image. For example, images in an RGB format have scale factors for each of the R, G and B color components. Similarly, images in a CMY format have scale factors for each of the C, M and Y components of each table entry. The scale factors for each entry are derived by rewriting the above mathematical expression and solving for each color's scale factor as a function of the known color component values.

Low Visibility Watermarks Using an Out-Of-Phase Color

Three-color components, such as Red, Green, Blue (RGB) or Luminance, color component "a" and color component "b" (Lab), can be combined to uniquely identify a particular color. In many cases, more than three-color components can be combined to specify (or approximate) the same particular color. Typically, four (4) color components, e.g., cyan, magenta, yellow and black (CMYK) are used in printing processes. Extra colors, sometimes referred to as "spot colors," can be added for more accurate color reproduction. A company logo, might include a particular shade of green, which is printed with a corresponding green ink (e.g., a green spot color). High fidelity color printing often uses more than four (4) color components. These additional color components expand the gamut of printing colors for very high quality printing, such as fine art reproduction. Security printing (e.g., bank notes, financial documents, certificates, etc.) also uses a plurality of inks, with fine lines, such as intaglio.

Printing processes with more than three (3) inks (or color component dimensions) have a built in redundancy, since more than three (3) color components (e.g., CMYK) are used to specify a color at a particular point in an image. This implies that many different combinations of four (4) or more printing inks (or components) can be used to represent a three (3)-component color. By way of example only, a point in the CMY color space (e.g., 61% cyan, 50% magenta, and 48% yellow) can be represented (or approximated) by a corresponding point in the CMYK color space (e.g., 51% cyan, 40% magenta, 38% yellow, and 22% black). This same 3-channel color point can also be represented in the CMYK color space as 32% cyan, 23% magenta, 22% yellow, and 43% black. Of course, this is but one of many possible color combinations. One aspect of the present invention utilizes this color redundancy, to reduce the human visibility of a digital watermark. For example, a watermark signal in one color channel, can be effectively counteracted (e.g., cancelled) in the other color (or black) channels, while still obtaining the desired color.

Another aspect of the present invention provides a fragile watermark. The watermark's fragility is due, at least in part, to its small-scale spatial variation within a media signal, making the watermark ideal to combat typical counterfeiting operations such as scanning/printing, digital manipulation and photocopying. Of course, the process described for "CMYK" media below, could also be applied in a similar manner to other multi-color plane printing processes.

Watermark Embedding

Media is embedded with a watermark signal. Of course, the media may correspond to a digital image or photograph, video frame, graphic, picture, etc., and in some cases, may even include a physical object such as a picture, graphic, image, photograph, graphic, logo, product tag, business card, art work, document, product packaging, trading card, banknote, deed, document, poster, ID card, postage stamp, etc., etc. Typically, a watermark signal has at least one component, which when embedded in the media corresponds to (or affects) various areas (or pixels) in the media. In the case of an area (or pixel) represented in a color space, the watermark signal component can be added to (or subtracted from) the point in all or some of the color dimensions.

Figure 3A:
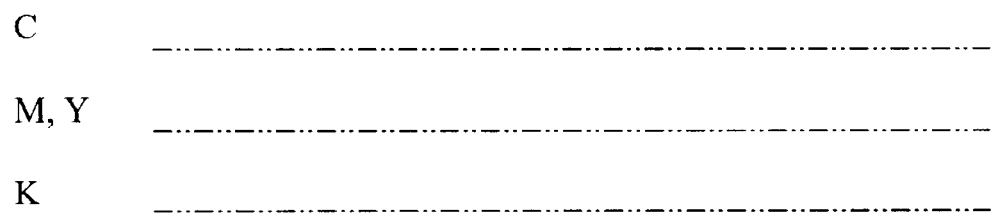
FIG. 3a is a diagram illustrating color data for a mid-gray image patch.
Figure 3B:
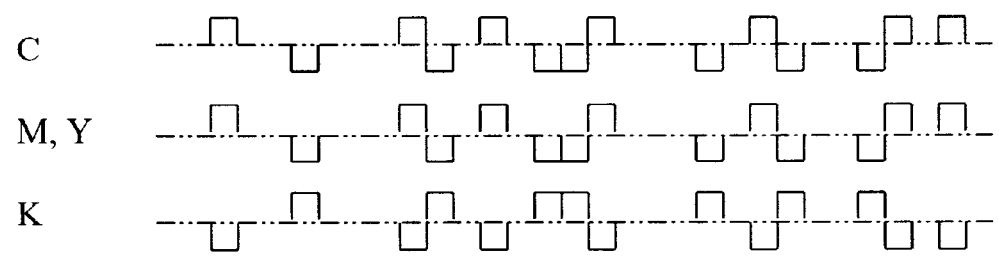
FIG. 3b illustrates the color data of FIG. 3a, embedded with a digital watermark signal.

Consider FIG. 3a, where the dash/dot C, M, Y and K lines represent respective cyan, magenta, yellow and black color dimensions for a line in a mid-gray patch of a media signal (e.g., a line in a picture, image, document, etc.). FIG. 3b illustrates the media of FIG. 3a, which has been embedded with a watermark signal. The watermark signal is preferably applied to each of the color component dimension (C, M and Y). In FIGS. 3a and 3b, the M and Y channels are represented by one signal, since these color components can be approximately equal, but separate signals for gray. Of course, it is not necessary for these components to be equal, and in many cases the yellow and magenta components are not equal. The illustrated embedded "bumps" in FIG. 3b represent the watermark signal, e.g., upward or downward signal adjustments in relation to the respective color channel at given points over the media line. For the K dimension (or channel), the watermark signal is preferably embedded to be out-of-phase with the CMY channels. Most preferably, the K channel is approximately 180 degrees out-of-phase (e.g., inverted) with the watermark signals in the CMY color channels, as shown in FIG. 3b. This inventive digital watermark is referred to as an out-of-phase digital watermark.

Figure 4:
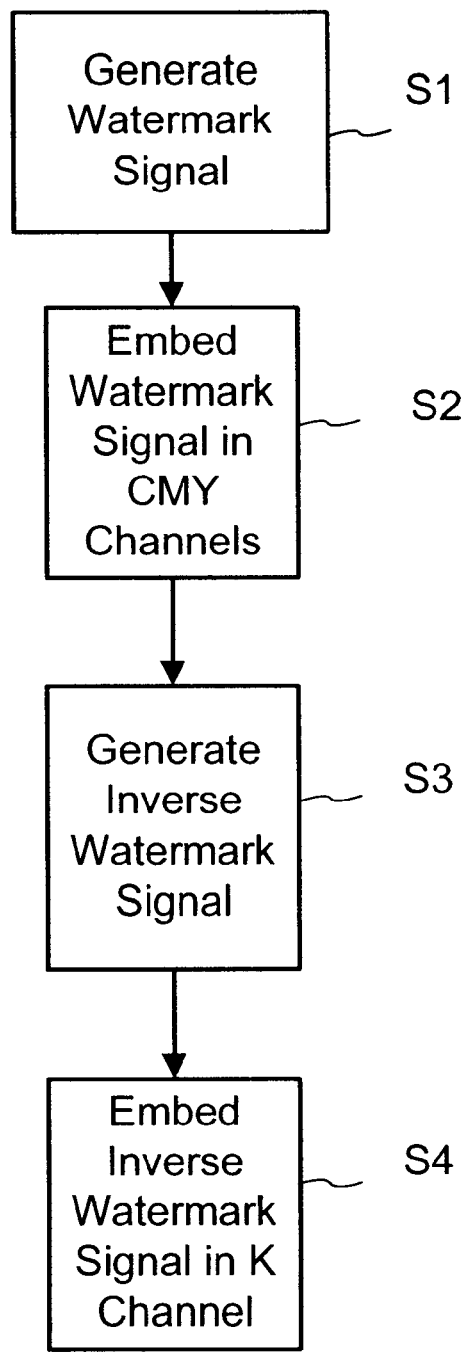
FIG. 4 is a flow diagram illustrating an embedding process.

With reference to FIG. 4, one out-of-phase embedding method generates (or determines) a watermark signal as shown in step S1. The watermark signal is embedded in the CMY channels in step S2. The inverse of the watermark signal is calculated in step S3, and such inverse signal is embedded in the K channel in step S4. Of course, the order of such steps is not critical. For example, a watermark signal can be determined, and an inverse calculated. The various color component dimensions can then be embedded. In another embodiment, the K channel is embedded with a watermark signal. An inverse signal is calculated, and the CMY channels are embedded with the inverse signal.

Such an inventive watermarking scheme greatly reduces watermark visibility. Since the watermark signal for the K channel is applied approximately 180 degrees out-of-phase, when compared to the respective changes applied to the CMY channels, the watermark visibility is greatly reduced. The visibility reduction is produced by the effective cancellation of perceived luminance changes when the CMYK image is viewed or printed. Indeed, combining an inverted watermark signal "tweak" or "bump" in a K channel, with a corresponding non-inverted watermark signal tweak or bump in the CMY channels effectively cancels an overall perceived luminance change—effectively reducing visibility of the digital watermark.

Watermark Detection

Figure 5:
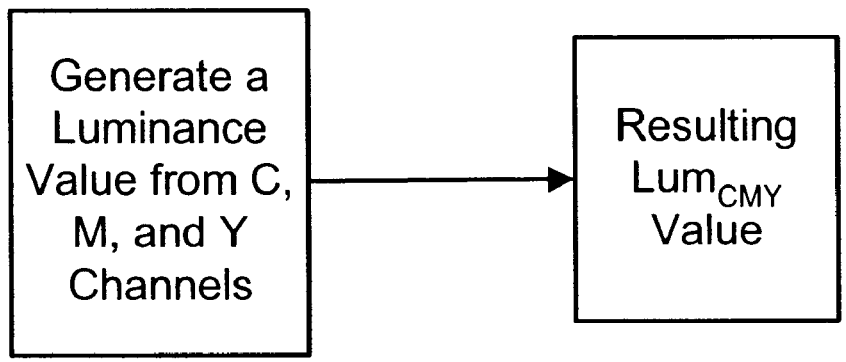
FIGS. 5 and 6 are diagrams regarding obtaining luminance values.
Figure 6:
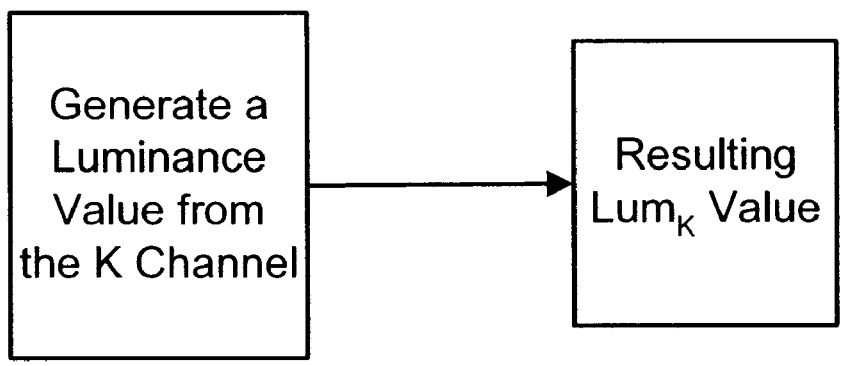

Another aspect of the present invention is a detection method and system for detecting an out-of-phase, color component-based digital watermark. Consider a first embodiment as depicted in FIGS. 5 and 6. A media signal is analyzed as follows. Initially, luminance values are determined for CMY and K color planes. The CMY luminance can be computed as a properly weighted sum of the cyan, magenta and yellow primary components. For example: Lum=0.3C+0.6M+0.1Y. (Of course, as will be appreciated by those skilled in the art, other weighting coefficients can be used to determine a CMY luminance.). So for a given point (or pixel), a luminance value is determined for the CMY color dimensions. Similarly, as shown in FIG. 6, a luminance value for K is determined. In one embodiment, the K luminance equals the value of the K component.

Figure 7:
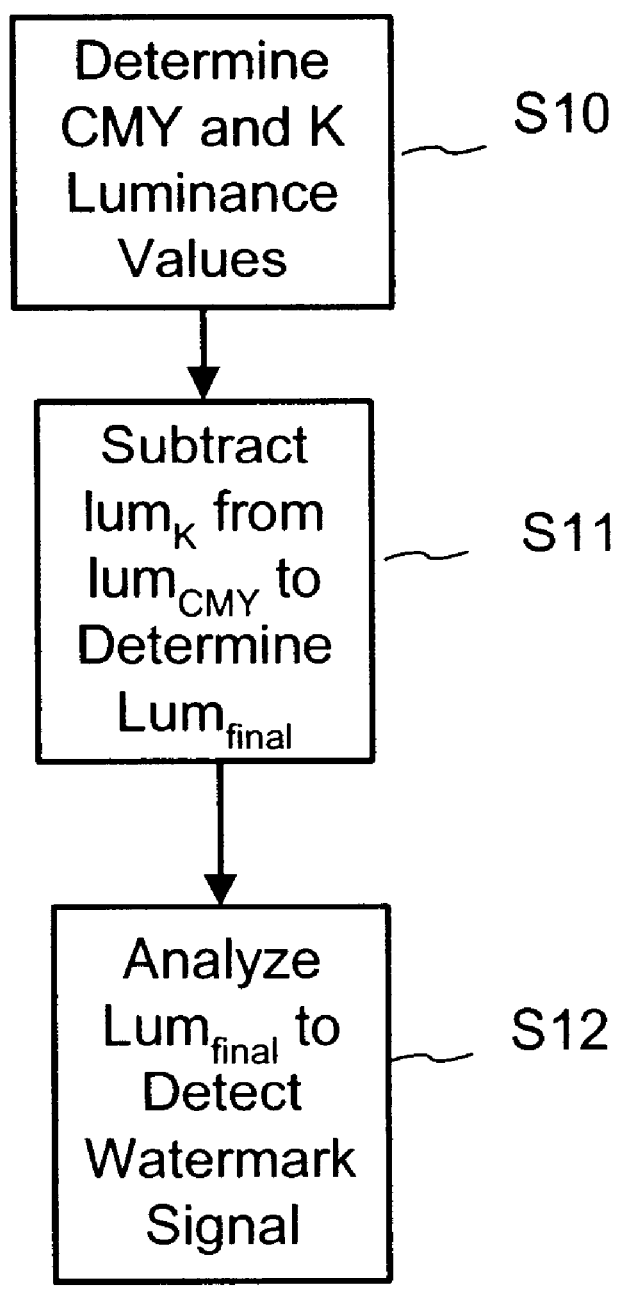
FIG. 7 is a flow diagram illustrating a detection method.

The detection process is further described with respect to FIG. 7. In step S10, CMY and K are converted to approximate luminance values per pixel (or area):

$$CMY => lum_{cmy}$$

$$K => lum_k,$$

where $lum_{cmy}$ is the luminance of CMY and $lum_k$ is the luminance of K. In step S11, $lum_k$ is subtracted from $lum_{cmy}$:

$$Lum_{final} = lum_{cmy} - lum_k.$$

The step S11 subtraction operates to help reduce image content, and to reinforce the watermark signal by effectively adding the K watermark signal value to the CMY watermark signal, since the K watermark signal is the inverse of the CMY channel signals.

As shown in step S12, $Lum_{final}$ can be analyzed for watermark detection. This method is particularly useful when an original out-of-phase embedded signal is available.

Figure 14:
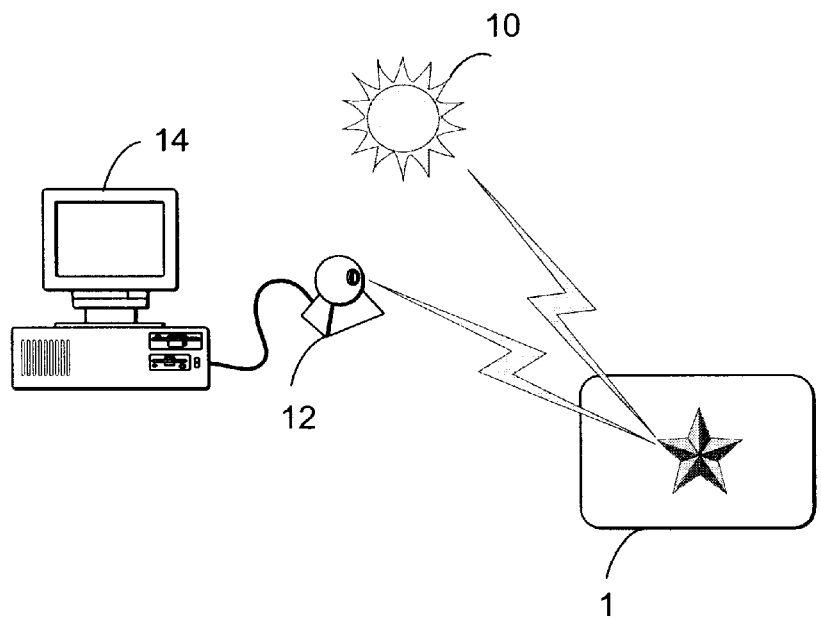
FIG. 14 is a functional diagram relating to an infrared detection technique for an out-of-phase digital watermark.

An infrared detection method is illustrated with reference to FIG. 14. In particular, the illustrated detection method employs infrared illumination to facilitate watermark detection. An out-of-phase digital watermark, embedded within media 1, is illuminated by an infrared illumination source 10. The digital watermark is embedded as discussed above, for example, to include various watermark components in a multicolor dimension space (e.g., CMYK). A first component is preferably embedded in the C, M and/or Y channels. A second component is embedded in the K channel. The second component is preferably inverted (or is out-of-phase) with respect to the C, M and/or Y channels. Infrared illumination source 10 illuminates media 1. Infrared illumination source 10 preferably includes a light emitting diode (e.g., emitting approximately in the range of 800 nm–1400 nm), or a plurality of light emitting diodes ("LED"). In a preliminary experiment, we employed three Radio Shack infrared diodes (part no. 276-143c) as the illuminating source. Of course, there are many other commercially available infrared diodes, and such may be suitable interchanged with our present invention. A variable trim resistor and a small wall transformer can be optionally employed to control illumination source 10. A conventional power source powers the infrared LED circuit. (It will be appreciated that power can be supplied from a battery pack, voltage or current source, or by directly tapping a power source of a camera, e.g., internally drawn from the parallel, USB, or corded power lines. For a consumer device, a battery pack or a single power cord that is stepped down inside a digital watermark reader housing could also be used.). It will be appreciated that many commercially available incandescent light sources emit light both in the visible and infrared ("IR") spectrums. Such incandescent light sources may alternatively be used as infrared illumination source 10. Indeed, infrared watermark detection may be possible in otherwise normal ("daylight") lighting conditions, particularly with an IR-pass filter.

Camera 12 captures an image of media 1. Preferably, camera 12 includes an IR-Pass filter that passes IR while filtering visible light. (See FIG. 15 for the general IR-pass filter characteristics.). For example, the Hoya RM90 filter available from M&K Optics L.L.C. is one of many IR-Pass/Visible Opaque filters suitable for daylight detection. Another suitable filter is the RG850 filter, part number NT54-664, available from Edmund Scientific. These filters are offered as examples only, and certainly do not define the entire range of suitable IR-pass filters. Of course there are many other IR-Pass filters that are suitably interchangeable with the present invention.

In another embodiment, a conventional digital camera (or web cam) is modified so as to capture infrared light. In particular, most digital cameras and web cams include an IR filter, which filters out IR light. Removing the IR filter allows the camera to capture light in the IR spectrum. Consider a visibly dark environment (e.g., enclosed case, shielded area, dark room, etc.). Media 1 is illuminated by infrared illumination source 10 in the visibly dark environment. Camera 12 (without an IR filter) effectively captures an infrared image corresponding to the illuminated media 1.

The captured image is communicated to computer 14. Preferably, computer 14 includes executable software instructions to detect and decode the digital watermark embedded within media 1. The software instruction can be stored in memory or electronic memory circuits. Of course, computer 14 can be a handheld computer, a laptop, a general-purpose computer, a workstation, etc. Alternatively, computer 14 includes a hard-wired implementation, which precludes the need for software instructions.

Returning to the composition of an out-of-phase digital watermark, a first watermark component is preferably embedded, e.g., in the C, M and/or Y channels. A second watermark component, e.g., which is out-of-phase with respect to the CMY channels, is embedded in the K (or black) channel. These characteristics have significance for infrared detection. In particular, the C, M and Y channels have high transmission characteristics in the infrared spectrum, which render them nearly imperceptible under infrared conditions. (See FIGS. 16a and 16b. Note that while these graphs terminate at 690 nm, their high transmission characteristics continue into the infrared spectrum. With respect to FIG. 16c, cyan also has relatively high transmission characteristics in the infrared spectrum (not shown), unlike its transmission characteristic in the 540–690 mn range as shown.). Black, on the other hand, absorbs a relatively high amount of infrared light, rendering the black channel perceptible with infrared illumination. (See FIG. 16d. Black's low transmission characteristics continue as such in the infrared spectrum.).

Accordingly, a captured infrared image primarily portrays (e.g., emphasizes) the black channel, while the C, M and Y channels are effectively imperceptible due to their high transmission properties in the infrared spectrum. The digital watermark component in the isolated black (K) channel can be detected and decoded without interference from the C, M and Y channels. Indeed, since the black channel is perceptible under infrared conditions, the embedded watermark signal is effectively detected from such.

Figure 17:
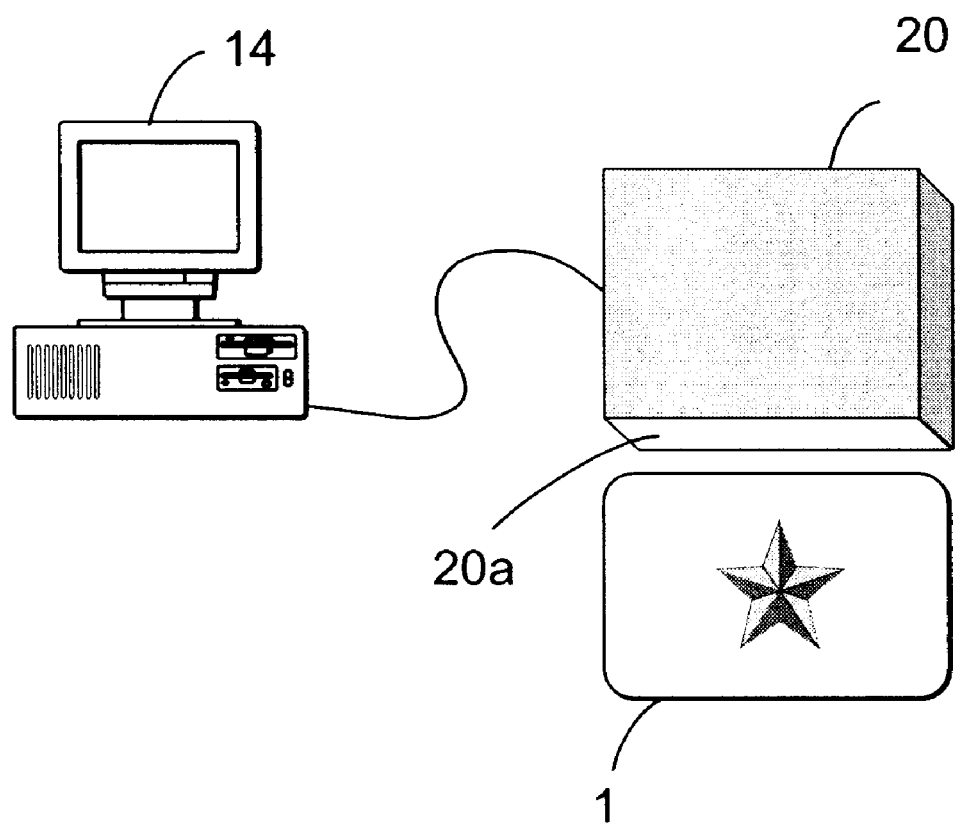
FIG. 17 illustrates an infrared detection apparatus.

In an illustrative embodiment, with reference to FIG. 17, a detection housing 20 houses an infrared illumination source 10 and digital camera 12 (not shown in FIG. 17, since they are within the opaque housing 20). The housing 20 is preferably opaque (or otherwise constructed to filter) to shield the camera 12 and media 1 from visible light. The housing 20 has an opening 20a to receive the media 1. In a first case, opening 20a is adapted to engulf media 1. This allows media 1 to be placed on a surface (e.g., table, imaging station, or counter) and the housing opening 20a to be placed over media 1, effectively shielding media 1 from visible light. In a second case, the opening 20a receives media 1 into (e.g., slides media through opening 20a) and positions media 1 within the opaque housing 20. In either case, the infrared illumination source 10 illuminates media 1, and the digital camera 12 captures an image of the illuminated media. The digital camera 12 communicates with computing device 14, which detects and decodes a digital watermark embedded with media 1.

In another illustrative embodiment, the above described infrared detection technique is carried out in a visibly dark environment, such as a dark room, shielded area, etc. An out-of-phase digital watermark is embedded in media. The media is illuminated with an infrared illumination source, and a digital camera captures an image of the illuminated media. The digital camera communicates with a computing device, which detects and decodes an out-of-phase digital watermark embedded in the media.

Figure 15:
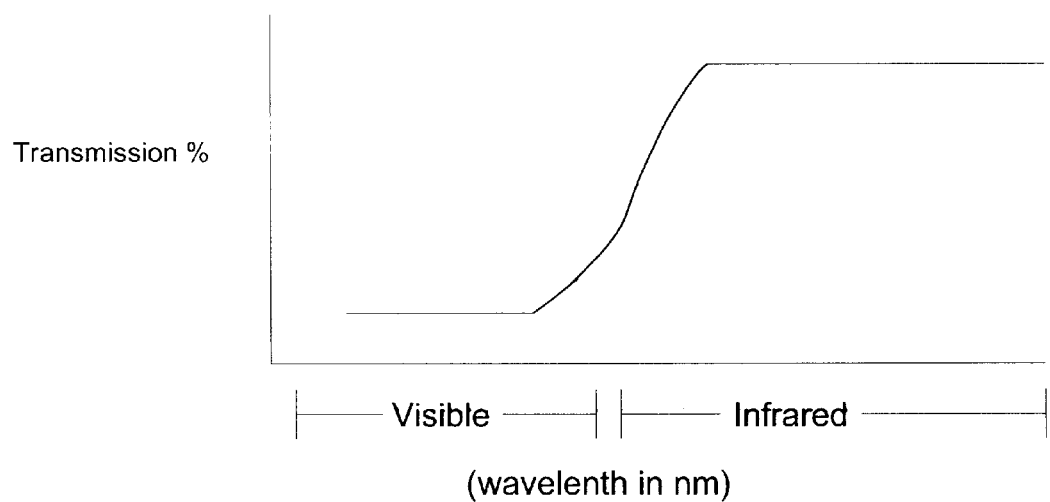
FIG. 15 is a graph illustrating characteristics of a typical IR-pass filter.

In still another illustrative embodiment, the above described infrared detection technique is carried out in a visibly lighted environment. An out-of-phase digital watermark is embedded in media. The media is illuminated with an infrared illumination source, and a digital camera captures an image of the media. Preferably, the camera includes an IR-pass filter with characteristics as shown in FIG. 15. The digital camera communicates with a computing device, which detects and decodes an out-of-phase digital watermark embedded in the media.

Infrared detection is an elegant solution to detect out-of-phase digital watermarks, since high transmission colors in the IR spectrum are effectively washed out, allowing detection of a low transmission color channel. Specialized inks are not required to embed the out-of-phase digital watermark. Indeed most multicolor printer ink packs are sufficient for infrared detection. Some of these multicolor printer ink packs include a carbon-based black ink, furthering the absorption of IR. While infrared detection is ideal for out-of-phase digital watermarks, this method is also applicable to detection of conventional digital watermarks. For instance, a watermark signal can be embedded only in a black channel of media. Infrared illumination helps to reveal the embedded watermark in this black channel. Alternatively, a digital watermark is embedded across many color planes, while detection is carried out in only those color planes that are perceptible with IR illumination.

Fragile Watermark

An out-of-phase watermark is fragile since a signal processing operation that combines the K channel with the CMY channel effectively cancels the watermark signal. Conversion to other color spaces similarly degrades the watermark signal. Take a typical scan/print process for example. Digital scanners typically convert scanned images into a RGB color scheme. Scanning an out-of-phase embedded CMYK image degrades the embedded watermark due to the combination of K with CMY in a local area. When the RGB image representation is printed, the watermark signal is difficult to detect, particularly with a low resolution RGB scan. Similarly, other conversions, such as to a Lab color space, degrade the out-of-phase watermark due to the combination of K with CMY throughout local areas. Nevertheless, the watermark signal is detectable with CMYK data as described above with respect to FIG. 7.

A fragile watermark has utility in many applications. Take counterfeiting, for example. The inventive fragile watermark is embedded in original CMYK media. If the media is copied, the embedded fragile watermark is either lost or degrades predictably. The copy is recognized as a copy (or counterfeit) by the absence or degradation of the fragile watermark. Fragile watermarks can also be used in conjunction with other watermarks, such as robust watermarks. The fragile watermark announces a copy or counterfeit by its absence or degradation, while the other robust watermark identifies author, source, links and/or conveys metadata or other information, etc. In other embodiments, a fragile watermark is an enabler. For example, some fragile watermark may include plural-bit data that is used to enable a machine, allow access to a secure computer area, verify authenticity, and/or link to information. This plural-bit data is lost or sufficiently degrades in a copy, preventing the enabling functions. Other fragile watermark applications are discussed in the U.S. patent applications incorporated above.

High Resolution Scan of Watermarked Image

Oftentimes, CMYK data may not be available for a detection process. For example, a watermarked CMYK image may be optically scanned with a scanner that converts the CMYK data into a different color space, such as to RGB. A high resolution RGB scan may nevertheless be used to recover an estimation of the watermark signal, which would be otherwise undetectable with a low RGB resolution scan.

Figure 8:
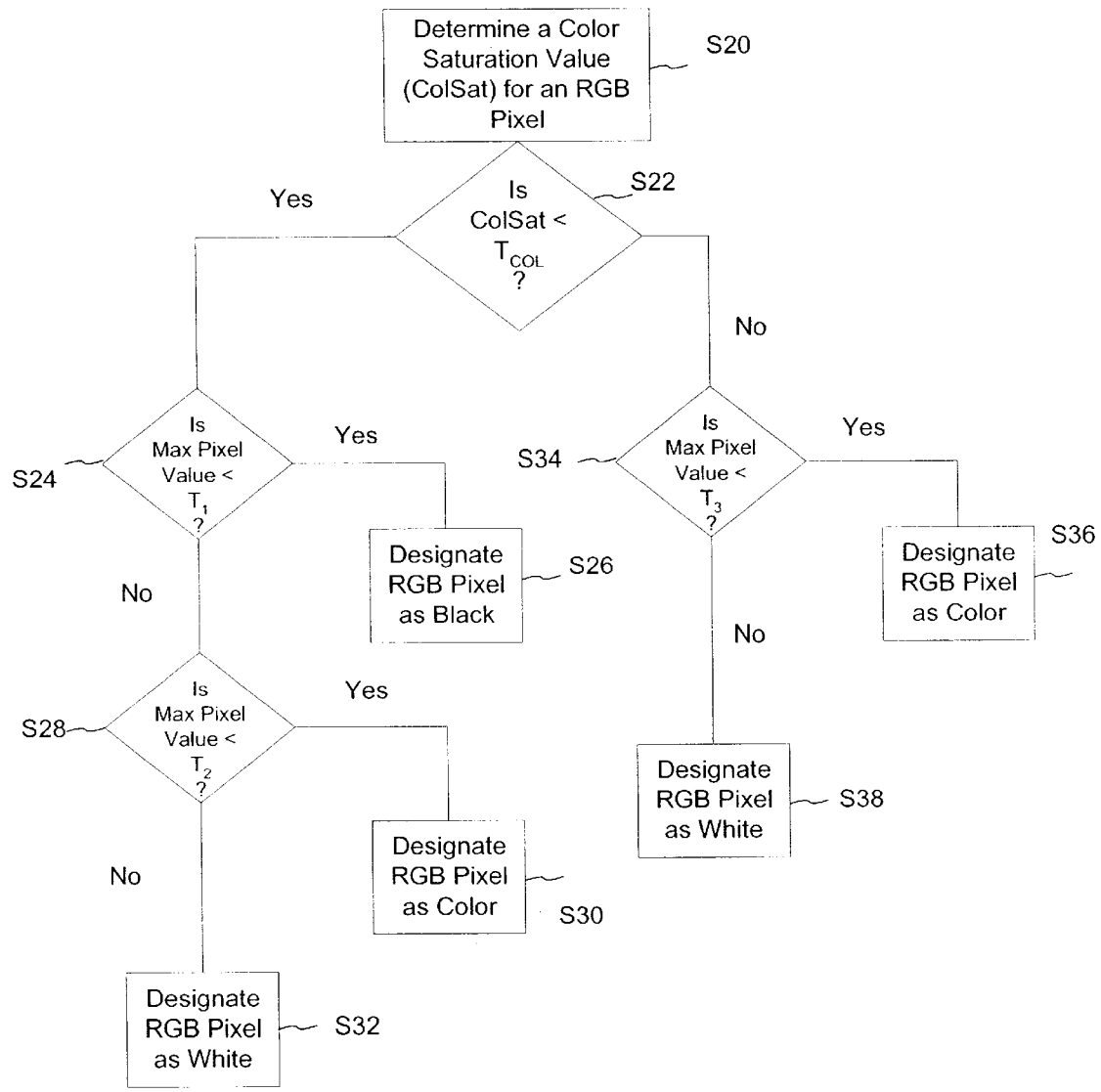
FIG. 8 is a flow diagram illustrating a detection method of data in a RGB color space.

In this case, pixels can be assigned color or K values to generate respective color and K planes. A final luminance value can be determined from these planes. Consider the following method, as shown in FIG. 8, for a high resolution RGB scan (e.g., about 8 times the screen ruling or more) of a CMYK image.

Figure 9:
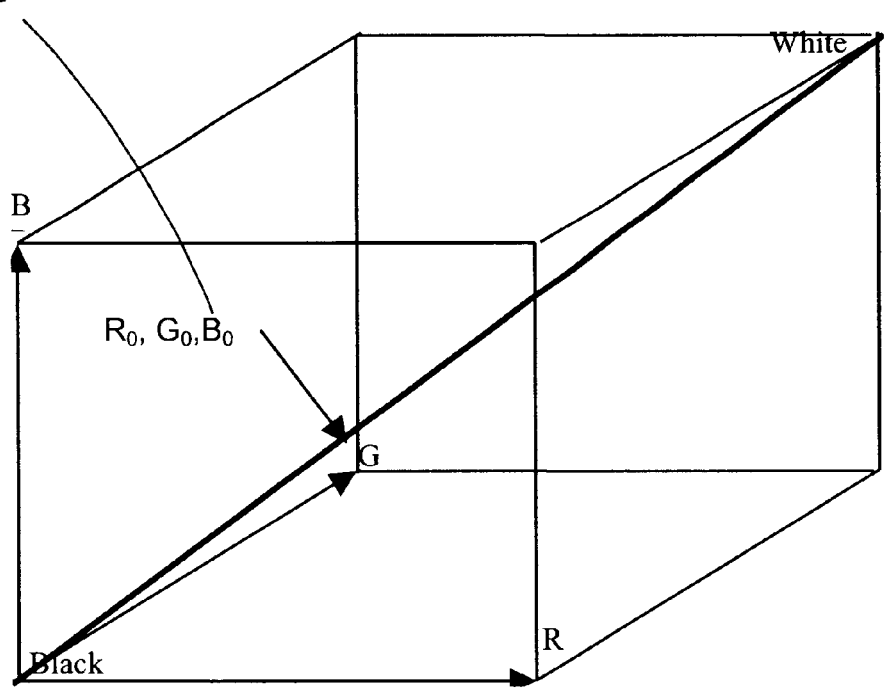
FIG. 9 illustrates approximating a color saturation value in an RGB color space.

In step S20, a color saturation (ColSat) value is determined for each RGB pixel. ColSat can be calculated by dropping a perpendicular line from a measured RGB value (e.g., $R_0$, $G_0$, $B_0$, as shown in FIG. 9) to the RGB luminance axis. This color saturation calculation alternatively can be approximated by:

$$ColSat=\max(RGB)-\min(RGB),$$

where max(RGB) is determined by taking the maximum of the red, green and blue values $R_0$, $G_0$, $B_0$, and min(RGB) is determined by taking the minimum of the red, green and blue values $R_0$, $G_0$, $B_0$. Of course, other known methods for determining a color saturation value are suitably interchangeable with this step.

Figure 11:
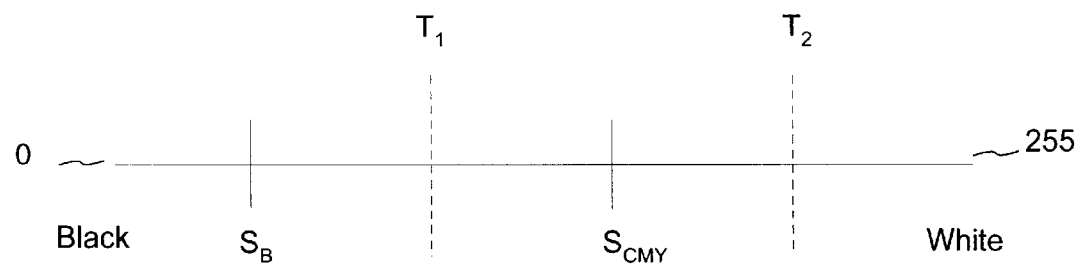
FIGS. 11 and 12 are diagrams illustrating relative threshold values for the method shown in FIG. 8.

In step S22, preferably for each RGB pixel (or pixel area), it is determined whether ColSat<$T_{col}$, where $T_{col}$ is a predetermined threshold color saturation, e.g., based on a scanner calibration, detection sensitivity and/or other threshold number. For example, a pure cyan pixel will typically correspond to a (0, 100, 100) RGB value. However, a scanner may read this pixel as a (20, 80, 80) RGB value. The threshold value $T_{col}$ can be set to allow for such scanner sensitivity. $T_{col}$ can also be adjusted to reflect acceptable tolerances. If ColSat<$T_{col}$, flow continues to step S24, where it is determined whether the maximum measured (e.g., determined, scanned, calculated, etc.) pixel value is <$T_1$. Here, $T_1$ is a predetermined pixel value, e.g., based on scanner calibration, detection sensitivity and/or other threshold numbers. FIG. 11 illustrates a graphical relationship that shows digital threshold and scanner pixel values on a scale between Black (0) and white (255). Value $S_B$ is a scanner measured (or designated) black, which due to scanner sensitivity and/or characteristics is generally offset from black (0). Similarly, SCMY is a scanner measured CMY overprint (e.g., a 100% overprint). If the maximum pixel value is <$T_1$ the pixel is designated as black (K) in step S26. A corresponding pixel range is shown graphically in FIG. 11, as the values less than $T_1$. As discussed, $T_1$ can be selected based on scanner characteristics. In one embodiment, $T_1$ is selected to have a value midway between scanner-measured black ($S_B$), and scanner measured CMY overprint ($S_{CMY}$). Of course, $T_1$ can be adjusted from this midpoint value to accommodate sensitivity requirements and/or scanner characteristics. (A maximum pixel value can be chosen in a number of known techniques, such as selecting the color component of a pixel, e.g., if a measured pixel corresponds to (20, 70, 80), the color component 80 comprises the maximum pixel value.).

If the max pixel value is not <$T_1$, the pixel value is compared against another threshold value. In step S28, it is determined whether the max pixel value is <$T_2$. If so, the pixel is designated as color in step S30. Returning again to FIG. 11, the corresponding range of pixel values falls between $T_1$ and $T_2$. The threshold value $T_2$ can be selected based on scanner characteristics, or based on sensitivity requirements. In one embodiment, $T_2$ is selected to have a value midway between $S_{CMY}$ and white (255). Of course, this value can be adjusted based on sensitivity need and/or scanner characteristics.

If the max pixel value is not <$T_2$, the pixel value is designated as white in step S32. The corresponding pixel range lies between $T_2$ and white (255).

Figure 12:
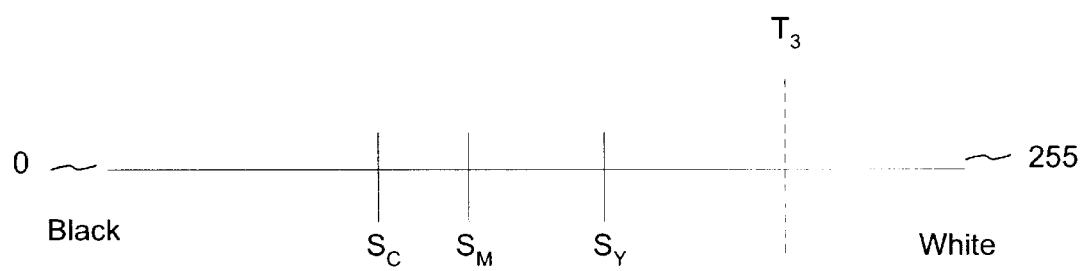

If in step S22, it is determined that ColSat is not <$T_{col}$, flow continues to step S34, where it is determined whether the max pixel value is <$T_3$. If so, the pixel is designated as a color pixel in step S36. Here, $T_3$ is a predetermined pixel value. In one embodiment, $T_3$ is selected to have a value midway between a scanner measured (or determined) yellow value and white (255). Of course, this value can be adjusted based on sensitivity requirements and/or scanner characteristics. Otherwise, the pixel value is designated white in step S38. This relationship is shown in FIG. 12, where $S_C$, $S_M$ and $S_Y$ corresponding with scanner measured (or determined) cyan, magenta and yellow values.

Color and K planes can be constructed once each RGB color pixel is designated as a color, white or K pixel.

To create the K plane, pixels designated as black are turned "on," while the pixels that are designated as white or color are turned "off." In one embodiment, the respective "off" pixels are masked. In another embodiment, the off pixels (or alternatively the on pixels) are flagged or otherwise marked to indicate their designation and/or inclusion/non-inclusion.

Similarly, to create the color plane, pixels designated as "white" or "black" are turned off, while the rest of the pixels (e.g., the color pixels) are turned on.

The pixel (or area) values are summed for the color plane to obtain a low resolution (LR) color luminance ($lum_{color}$) per pixel (or per area). Similarly, the pixel values are summed for the black plane to obtain a LR black luminance ($lum_K$). A final luminance value ($lum_{final}$) for each pixel (or area) can be determined from:

$$lum_{final} = lum_{color} - lum_k.$$

The $lum_{final}$ value can be passed into a watermark detection process.

Figure 10:
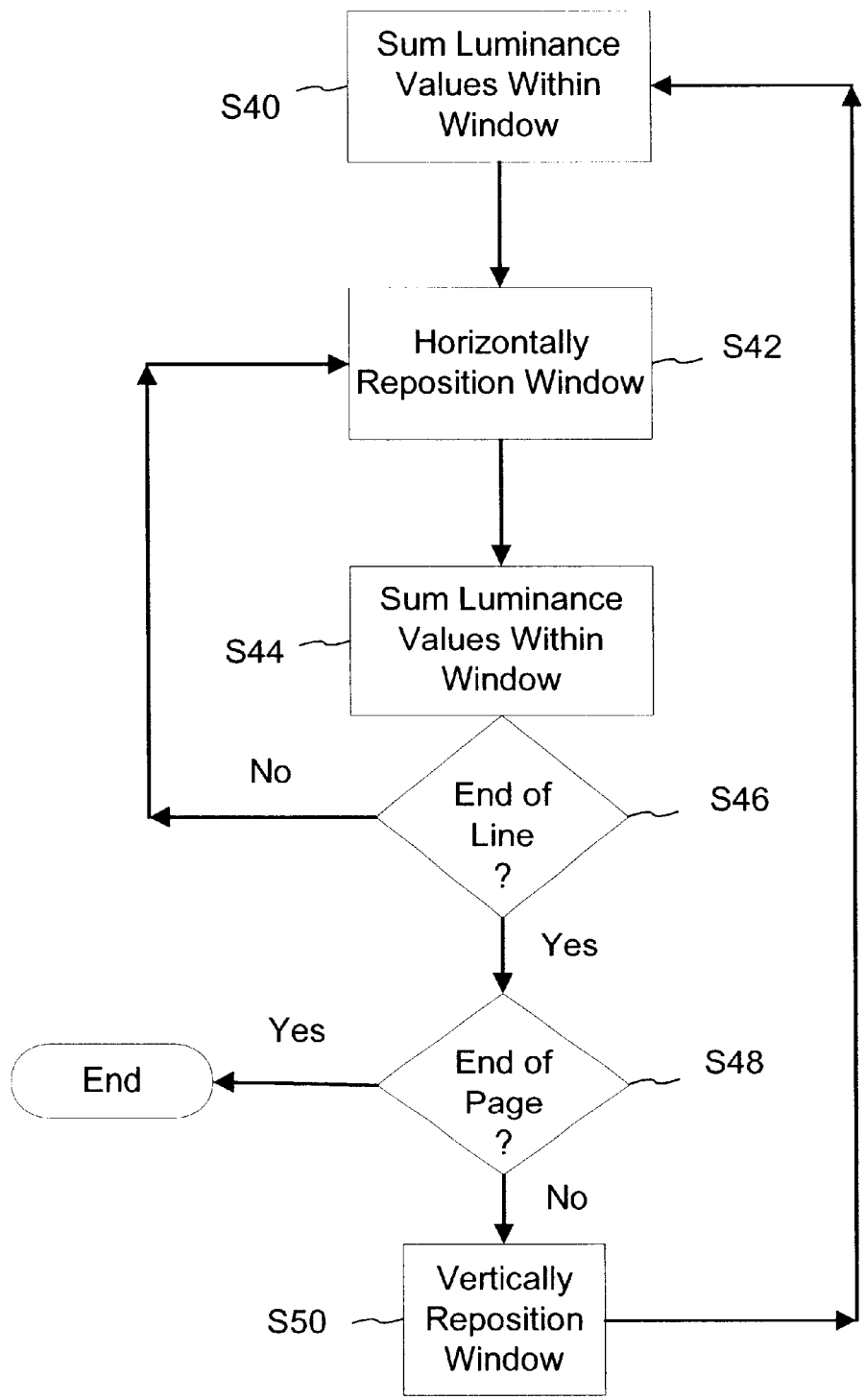
FIG. 10 is a flow diagram illustrating a luminance collection method according to the present invention.

FIG. 10 illustrates one possible summing method for each color (color and K) plane according to a preferred embodiment to achieve the above color and black luminance values.

In step S40, each of the luminance values within a predetermined window (or pixel area) are summed. The window may be an n×n window, or and n×m window, where n and m are integers. In a preferred embodiment, pixels values with an 8×8 pixel window are summed. The resulting summation value is preferably saved for comparison against the other plane (color or K), to determine $lum_{final}$ as discussed above.

In step S42, the window location with respect to the color (or K) plane is repositioned (e.g., the window is a sliding window). To illustrate, if a first window frames the first n×n pixels in a color (or K) plane, the second window is adjusted to cover a new area, or an overlapping area. In the preferred embodiment, the window slides right (or horizontally) by four (4) pixels (e.g., on a first slide, the window now covers the $5^{th}$-$12^{th}$ pixels×8). The luminance values within this second window are added in step S44. This value is preferably saved for comparison against the other color plane (or K plane), to determine $lum_{final}$ as discussed above.

The method determines if the window is at the end of a line (e.g., at the end of a plane edge) in step S46. If not, flow continues to step S42, where the window location is again repositioned. Otherwise, it is determined whether the entire plane has been analyzed in step S48. If so, the method ends. Otherwise, the window location is repositioned in step S50. The step S50 location adjustment preferably moves the window location down (or vertically) with respect to the plane to cover a new area or an overlapping area. In the preferred embodiment, the window is shifted down by 4 pixels. At this step, it is important to note that the new window location need not be realigned at the staring point (e.g., the top-left corner of the plane), but may be shifted down at the right plane edge. The window may then slide right to left. Of course, the step S50 alignment may locate the window below the original starting point (e.g., the left plane edge), with the window sliding left to right. Flow continues from step S50 to S40.

This process is preferably carried out for each of the color and K planes. The resulting area black luminance values are subtracted from the corresponding resulting color luminance values to achieve the final luminance value. This final luminance value (for each location area) can be analyzed to detect the watermark signal.

Embedding in Out-Of-Range Colors

Figure 13:
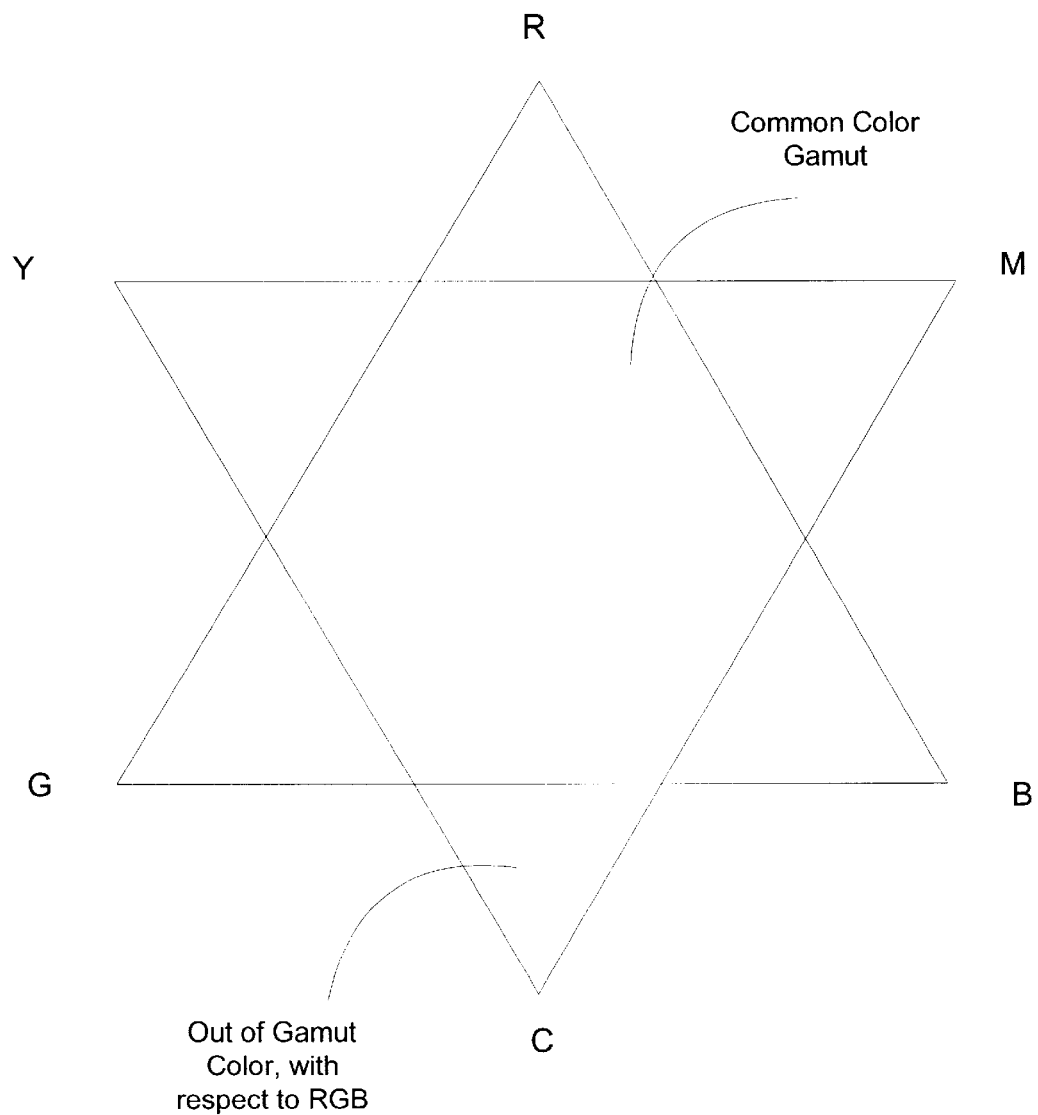
FIG. 13 is a diagram illustrating RGB and CMY common color gamuts, and out-of-gamut colors.

Another inventive fragile watermarking technique embeds watermark data in out-of-range colors. A color gamut defines a range of colors. Different color schemes (e.g., RGB and CMY) generally include a unique color gamut. Such color schemes will most certainly have overlapping color gamuts (or ranges), and unique (or out of gamut) color ranges, as shown in FIG. 13.

Differences in gamut between color models can be used to indicate that a transformation (or copy) has occurred. Consider security printers, which often select inks that lie outside the common color gamuts of capture devices (RGB) when printing documents. Printing with such out-of-range (or out of gamut) colors makes counterfeiting even more difficult. Consider a document that is printed with some dark blues & violets in the CMYK space, which are out of gamut for the RGB space. When a scanner scans the CMYK document, it typically converts the scanned image into the RGB space. Such processing looses the dark blues and violets in the conversion. An educated inspector can identify a counterfeit document by looking for the presence (or absence) of certain colors.

The inventive fragile watermark utilizes out-of-range color gamuts. Take the example given above. Dark blues & violets in the CMY (or CMYK) space are out of gamut with respect to the RGB space. Accordingly, a mask (or color spectral analysis) is used to identify dark blues and violets in a media signal. These areas are used (e.g., masked) as the areas for embedding watermark signals. The watermark is detectable with a CMY detection process. However, if the document is scanned with a RGB element scanner, the watermark is generally lost. As discussed above, conversion from CMYK to RGB fails to accurately convert out-of-phase colors. In this case, the dark blues and violets are out-of-gamut. Accordingly, since the watermark signal is embedded in the out-of-gamut colors, it is lost (or predictably degraded) during the conversion from CMY to RGB.

Consider the possibilities of such a fragile watermark. One can track, trace, detect counterfeits, control enabling functions, and many, many more applications, like those discussed above.

Concluding Remarks

The foregoing are just exemplary implementations of the present invention. It will be recognized that there are a great number of variations on these basic themes. The foregoing illustrates but a few applications of the detailed technology. There are many others.

It should be appreciated that the order of steps in the FIGS. 4, 8, and 10 flow charts can be reordered without deviating from the scope of the present invention. For example, in FIG. 4, the K channel could be embedded first, and then the CMY channels. Or the K channel could be embedded concurrently with or in between the color channels. In FIG. 8, instead of basing the step S22 decision on color saturation, the step S22 decision could be based on whether the pixel value is above or below one or all of the predetermined thresholds. The color saturation could be analyzed in subsequent steps. Also, the signs of the decisions can be reversed, which will respectively reverse the decision tree branches, and color ranges. Also, decisions could be based on whether a pixel value is less than, or equal to a threshold value. Moreover, instead of a maximum pixel value, an average pixel value, or lower pixel value could be used. In FIG. 10, the window could alternatively be first vertically repositioned, and then horizontally. The window can also be repositioned on a random, or pseudo-random basis. The window size may also be varied. Also whereas the FIGS. 3a and 3b illustrate a mid-gray patch, the present invention is not so limited. Indeed the scope of the present invention covers any set of 2 or more primary colors.

Preferably, an out-of phase watermark signal is embedded 180 degrees out-of-phase with corresponding channels. However, some cancellation will still be achieved if the signal is approximately 180 degrees, for example, in a range of ±0–20 degrees from the 180-degree mark. The term "inverted" includes values within this range.

The section headings in this application are provided merely for the reader's convenience, and provide no substantive limitations. Of course, the disclosure under one section heading may be readily combined with the disclosure under another section heading.

To provide a comprehensive disclosure without unduly lengthening this specification, the above-mentioned patents and patent applications are hereby incorporated by reference. The particular combinations of elements and features in the above-detailed embodiments are exemplary only; the interchanging and substitution of these teachings with other teachings in this application and the incorporated-by-reference patents/applications are also contemplated.

The above-described methods and functionality can be facilitated with computer executable software stored on computer readable media, such as electronic memory circuits, RAM, ROM, magnetic media, optical media, memory sticks, hard disks, removable media, etc., etc. Such software may be stored and executed on a general purpose computer, or on a server for distributed use. Data structures representing the various luminance values, summations, out-of-phase embedded signals, embedded color planes, color signals, data signals, luminance signals, etc., may also be stored on such computer readable media. Also, instead of software, a hardware implementation, or a software-hardware implementation can be used.

In view of the wide variety of embodiments to which the principles and features discussed above can be applied, it should be apparent that the detailed embodiments are illustrative only and should not be taken as limiting the scope of the invention. Rather, we claim as our invention all such modifications as may come within the scope and spirit of the following claims and equivalents thereof.

What is claimed is:

1. A method to detect an out-of-phase digital watermark, the out-of-phase digital watermark embedded in media, said method comprising:

illuminating the embedded media with infrared light;

capturing an image of the illuminated media; and analyzing the captured illuminated image to detect the out-of-phase digital watermark.

2. The method according to claim 1, wherein the out-of-phase digital watermark comprises at least a first component and a second component.

3. The method according to claim 2, wherein the first component is embedded in at least a first color plane, and the second component is embedded in at least a black color plane.

4. The method according to claim 3, wherein the second component is inverted with respect to the first component.

5. The method according to claim 4, wherein said black color plane includes black ink comprising carbon.

6. The method according to claim 1, further comprising the step of shielding the media from visible light.

7. The method according to claim 1, further comprising the step of filtering visible light before said step of capturing an image.

8. A method to detect a digital watermark embedded in media, wherein the digital watermark comprises a plurality of components, with at least some of the plurality of components cooperating to reduce localized perceptibility of the digital watermark, wherein at least one of the plurality of components is printed with a material that is responsive to non-visible light, said method comprising:

exposing the media with to the non-visible light; and detecting the at least one digital watermark component from the exposed media.

9. The method according to claim 8, wherein the digital watermark comprises an out-of-phase digital watermark.

10. The method according to claim 8, wherein the plurality of components include a plurality of colors.

11. The method according to claim 10, wherein the plurality of colors includes at least black and the at least one digital watermark component is embedded in the black color.

12. Apparatus to detect a digital watermark, wherein the digital watermark comprises a plurality of components, with at least a first component and a second component cooperating to reduce perceptibility of the digital watermark, said apparatus comprising:

an infrared illumination source to illuminate media embedded with a digital watermark; and an input device to capture an image of the media illuminated by said infrared illumination source.

13. The apparatus according to claim 12, further comprising electronic processing circuitry to process digital watermark detecting software instructions for detecting the digital watermark in a captured image.

14. The apparatus according to claim 13, wherein said input device comprises an infrared-pass filter.

15. The apparatus according to claim 14, wherein said digital watermark comprises an out-of-phase digital watermark.

16. The apparatus according to claim 12, further comprising an opaque housing to shield at least said input device.

17. The apparatus according to claim 12, wherein said input device comprises at least one of a digital camera and a web camera.

18. Apparatus to detect an out-of-phase digital watermark embedded in media comprising:

means for illuminating the media with infrared light;

means for capturing an image of the illuminated media; and means for analyzing the captured image to detect the out-of-phase digital watermark.

19. A method to detect a digital watermark embedded in at least a first of a plurality of color planes, said method comprising:

isolating the first color plane from the plurality of color planes; and analyzing the isolated color plane to detect the embedded digital watermark.

20. The method according to claim 19, wherein said isolating step comprises the step of illuminating the plurality of color planes with non-visible light.

21. The method according to claim 20, wherein the digital watermark comprises an out-of-phase digital watermark.

22. The method of claim 20, wherein the digital watermark comprises a first digital watermark component in a first of the plurality of color planes; and a second digital watermark component in a second of the plurality of color planes so as to be inverted relative to the first digital watermark component in the first color plane.

23. The method of claim 22, wherein the second digital watermark component offsets localized luminance that is attributable to the first digital watermark component when a printed object in which the digital watermark is embedded is illuminated in a visible spectrum.

24. A method to detect a digital watermark that is embedded in media including a plurality of channels, said watermark comprising a first digital watermark component embedded in a first of the plurality of channels; and a second digital watermark component embedded in a second of the plurality of channels, wherein the second digital watermark is generally inverted relative to the first digital watermark component in the first channel, said method comprising:

illuminating the media with non-visible light;

capturing an image of the illuminated media; and analyzing the captured image to detect the digital watermark.

25. The method of claim 24 wherein the second digital watermark component in the second of the plurality of channels is embedded so as to be spatially registered with the first digital watermark component in the first of the plurality of channels when the media is printed.

26. The method of claim 24, wherein the second digital watermark component in the second of the plurality of channels is embedded so as to cancel at least some visibly perceptible artifacts that are caused by the embedding of the first digital watermark component.

27. The method of claim 24, wherein the second digital watermark component in the second of the plurality of channels is embedded so as to cancel at least some luminance, perceptible in a visible spectrum, that is attributable to the first digital watermark component embedded in the first of the plurality of channels when both channels are printed.

28. The method of claim 24 wherein the second digital watermark component in the second of the plurality of channels is embedded so as to be spatially inverted relative to the first digital watermark component in the first channel.

29. The method of claim 28, wherein the image is captured in at least one of the visible spectrum and the infrared spectrum.

30. The method of claim 24, wherein the non-visible light comprises infrared light.

31. A method of detecting a digital watermark component embedded in media that includes a plurality of channels, the digital watermark comprising a first digital watermark component embedded in a first channel, and a second digital watermark component embedded in a second channel, wherein the second digital watermark component is embedded so as to be registered with the first digital watermark component to reduce at least some visual artifacts in a visible spectrum that are attributable to the first digital watermark component, said method comprising:

illuminating the media with non-visible light;

capturing an image of the illuminated media; and analyzing the captured image to detect the digital watermark.

32. The method of claim 31 wherein at least one of the first channel and the second channel comprises a black channel.

33. The method of claim 32, wherein the first channel comprises a cyan channel, a magenta channel and a yellow channel, and the second channel comprises a black channel.

34. The method of claim 32, wherein the second channel comprises a cyan channel, a magenta channel and a yellow channel, and the first channel comprises a black channel.

35. The method of claim 31, wherein the second digital watermark component comprises the first digital watermark component but in an inverted form, and wherein the visual artifacts comprise a change in luminance that is attributable to the first digital watermark component when printed.

36. The method of claim 31, wherein the non-visible light comprises infrared light.

* * * * *

UNITED STATES PATENT AND TRADEMARK OFFICE
CERTIFICATE OF CORRECTION

PATENT NO. : 6,763,123 B2
APPLICATION NO. : 09/933863
DATED : July 13, 2004
INVENTOR(S) : Alastair M. Reed and Jeremy Cattone It is certified that error appears in the above-identified patent and that said Letters Patent is hereby corrected as shown below:

Title Page,
Item (63), Under "Related U.S. Application Data" delete lines 1-15 and insert the following:

--Related U.S. Application Data

(63) Continuation-in-part of application No. 09/898,901, filed on Jul. 2, 2001, which is a continuation-in-part of application No. 09/553,084, filed on Apr. 19, 2000, now Pat. No. 6,590,996.--

Signed and Sealed this

Eleventh Day of October, 2011

David J. Kappos
*Director of the United States Patent and Trademark Office*